United States Patent
Lee et al.

(10) Patent No.: US 12,056,595 B2
(45) Date of Patent: Aug. 6, 2024

(54) METHOD AND APPARATUS FOR PROCESSING CONVOLUTION OPERATION IN NEURAL NETWORK USING SUB-MULTIPLIERS

(71) Applicant: Samsung Electronics Co., Ltd., Suwon-si (KR)

(72) Inventors: Sehwan Lee, Suwon-si (KR); Namjoon Kim, Anyang-si (KR); Joonho Song, Hwaseong-si (KR); Junwoo Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1195 days.

(21) Appl. No.: 16/158,660

(22) Filed: Oct. 12, 2018

(65) Prior Publication Data

US 2019/0171930 A1    Jun. 6, 2019

(30) Foreign Application Priority Data

Dec. 5, 2017    (KR) .................. 10-2017-0166203

(51) Int. Cl.
*G06N 3/063* (2023.01)
*G06F 17/15* (2006.01)
(Continued)

(52) U.S. Cl.
CPC ............. *G06N 3/063* (2013.01); *G06F 17/15* (2013.01); *G06N 3/04* (2013.01); *G06N 3/045* (2023.01); *G06T 1/20* (2013.01)

(58) Field of Classification Search
CPC ........ G06N 3/063; G06N 3/04; G06N 3/0454; G06N 3/08; G06F 17/15; G06F 7/523; G06F 7/5324; G06F 7/5443; G06T 1/20
See application file for complete search history.

(56) References Cited

U.S. PATENT DOCUMENTS

| 4,734,878 A | 3/1988 | Sutcliffe |
| 5,953,241 A | 9/1999 | Hansen et al. |

(Continued)

FOREIGN PATENT DOCUMENTS

| CN | 86107497 A | 5/1987 |
| CN | 107003988 A | 8/2017 |

(Continued)

OTHER PUBLICATIONS

"Gokhale, Snowflake: An Efficient Hardware Accelerator for Convolutional Neural Networks, May 2017 " (Year: 2017).*

(Continued)

*Primary Examiner* — Benjamin P Geib
(74) *Attorney, Agent, or Firm* — NSIP Law

(57) ABSTRACT

Provided are a method and apparatus for processing a convolution operation in a neural network, the method includes determining operands from input feature maps and kernels, on which a convolution operation is to be performed, dispatching operand pairs combined from the determined operands to multipliers in a convolution operator, generating outputs by performing addition and accumulation operations with respect to results of multiplication operations, and obtaining pixel values of output feature maps corresponding to a result of the convolution operation based on the generated outputs.

29 Claims, 23 Drawing Sheets

(51) Int. Cl.
*G06N 3/04* (2023.01)
*G06N 3/045* (2023.01)
*G06T 1/20* (2006.01)

(56) References Cited

U.S. PATENT DOCUMENTS

| | | | |
|---|---|---|---|
| 7,269,617 | B1 | 9/2007 | Esposito et al. |
| 7,391,915 | B1* | 6/2008 | Sankaran ............... G06F 17/148 |
| | | | 382/248 |
| 8,682,217 | B2 | 3/2014 | Murashima |
| 8,856,055 | B2 | 10/2014 | Brezzo et al. |
| 9,292,297 | B2 | 3/2016 | Gopal et al. |
| 9,361,534 | B2 | 6/2016 | Mizuno et al. |
| 10,167,800 | B1* | 1/2019 | Chung ..................... G06F 17/16 |
| 10,534,994 | B1* | 1/2020 | Kaul ....................... G06N 3/084 |
| 11,200,487 | B1* | 12/2021 | Grundmann ......... G06N 3/0675 |
| 2014/0169631 | A1 | 6/2014 | Mizuno et al. |
| 2016/0162402 | A1* | 6/2016 | Woolley, Jr. .......... G06V 30/142 |
| | | | 711/202 |
| 2016/0179434 | A1 | 6/2016 | Herrero Abellanas et al. |
| 2016/0328645 | A1 | 11/2016 | Lin et al. |
| 2016/0328646 | A1 | 11/2016 | Lin et al. |
| 2016/0328647 | A1 | 11/2016 | Lin et al. |
| 2016/0342890 | A1 | 11/2016 | Young |
| 2016/0342891 | A1 | 11/2016 | Ross et al. |
| 2016/0350645 | A1 | 12/2016 | Brothers et al. |
| 2016/0358069 | A1 | 12/2016 | Brothers et al. |
| 2016/0379115 | A1 | 12/2016 | Burger et al. |
| 2018/0189642 | A1* | 7/2018 | Boesch .................... G06F 30/34 |
| 2018/0232640 | A1 | 8/2018 | Ji et al. |
| 2019/0042948 | A1 | 2/2019 | Lee et al. |
| 2019/0065896 | A1 | 2/2019 | Lee et al. |
| 2019/0205746 | A1* | 7/2019 | Nurvitadhi ........... G06N 3/0454 |
| 2019/0220731 | A1 | 7/2019 | Woolley, Jr. et al. |
| 2020/0026992 | A1* | 1/2020 | Zhang ..................... G06N 3/049 |

FOREIGN PATENT DOCUMENTS

| | | |
|---|---|---|
| CN | 107153873 A | 9/2017 |
| CN | 107392314 A | 11/2017 |
| DE | 10 2015 224 026 A1 | 6/2016 |
| EP | 3 098 762 A1 | 11/2016 |
| JP | 2013-037488 A | 2/2013 |
| JP | 5346914 B2 | 11/2013 |
| KR | 10-2016-0142791 A | 12/2016 |
| WO | WO 2013/021823 A1 | 2/2013 |

OTHER PUBLICATIONS

"Park, (Zero and data Reuse-aware Fast Convolution for Deep Neural Networks on GPU), Oct. 2016" (Year: 2016).*

Shi, Jiangyi, et al. "The design and implementation of reconfigurable multiplier with high flexibility." 2011 International Conference on Electronics, Communications and Control (ICECC). IEEE, 2011. (Year: 2011).*

Rzayev, Tayyar, et al. "DeepRecon: Dynamically reconfigurable architecture for accelerating deep neural networks." 2017 International Joint Conference on Neural Networks (Ijcnn). IEEE, Jul. 2017. (Year: 2017).*

Brunelli, Claudio, et al. "A flexible multiplier for media processing." IEEE Workshop on Signal Processing Systems Design and Implementation, 2005 . . . IEEE, 2005. (Year: 2005).*

Harris, Mark, "Mixed-Precision Programming with CUDA 8", *Nvidia*, Oct. 19, 2016 (https://devblogs.nvidia.com/mixed-precision-programming-cuda-8/) (9 pages in English).

Parth S. Patel et al., "Design of High Speed MAC (Multiply and Accumulate) Unit Based On Urdhva Tiryakbhyam Sutra", *International Journal of Advanced Research in Computer Engineering & Technology*, vol. 4, No. 6, Jun. 1, 2015, (pp. 2545-2549).

Qiu, Jiantao et al., "Going Deeper with Embedded FPGA Platform for Convolutional Neural Network", *Proceedings of the 2016 ACM/Sigda International Symposium on Field-Programmable Gate Arrays*, FPGA '16, Jan. 1, 2016, (pp. 26-35).

Na, Taesik et al., "Speeding up Convolutional Neural Network Training with Dynamic Precision Scaling and Flexible Multiplier-Accumulator", *Low Power Electronics and Design*, ACM, 2 Penn Plaza, Suite 701 New York NY, 10121-0701 USA, Aug. 8, 2016, (pp. 58-63).

Ranganath L. et al., "Design of MAC Unit in Artificial Neural Network Architecture using Verilog HDL", *2016 International Conference on Signal Processing, Communication, Power and Embedded System (scopes)*, IEEE, Oct. 3, 2016, (pp. 607-612).

Extended European Search Report issued on Apr. 12, 2019 in counterpart European Patent Application No. 18208489.7 (11 pages in English).

Japan Office Action issued on Apr. 12, 2022, in the counterpart Japanese Patent Application No. 2018-221393 (5 pages in English and 6 pages in Japanese).

Chinese Office Action issued on Sep. 6, 2023, in counterpart Chinese Patent Application No. 201811297789.6 (10 pages in English, 9 pages in Chinese).

* cited by examiner

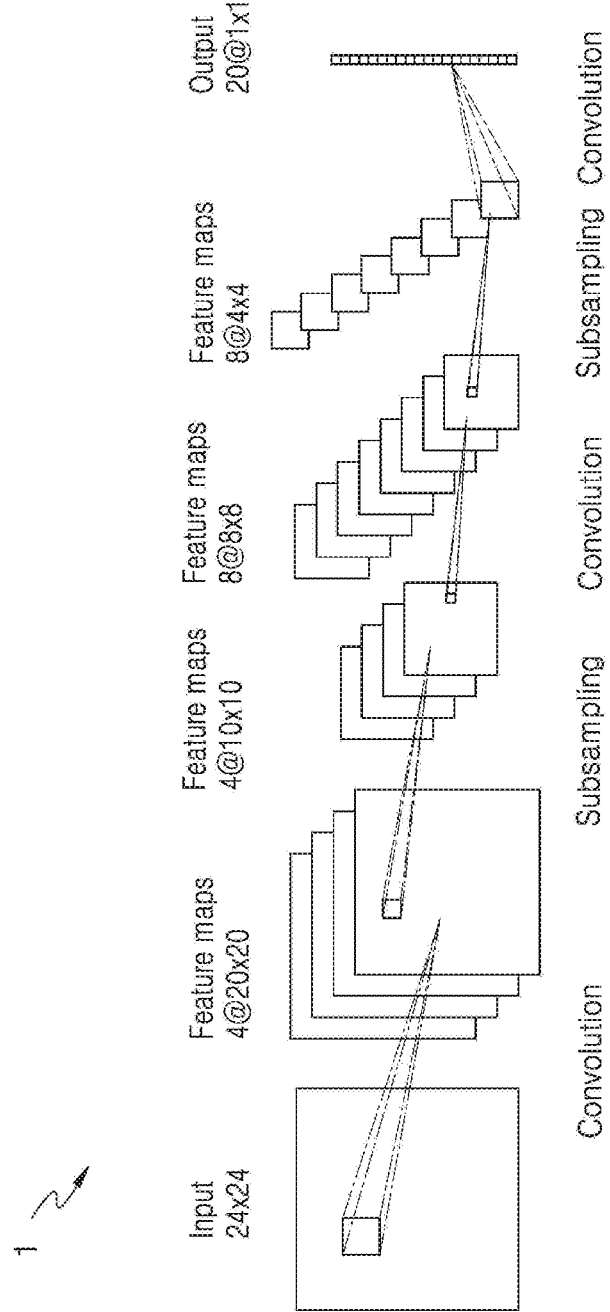

| MULTIPLIER TYPE | AREA | ENERGY | PROPORTION (AREA) | PROPORTION (ENERGY) |
|---|---|---|---|---|
| 4x4 bits | 15.86 um² | 0.057 pJ | 1 | 1 |
| 8x8 bits | 64.83 um² | 0.284 pJ | 4.08 | 4.98 |
| 16x16 bits | 240.59 um² | 1.200 pJ | 15.17 | 21.05 |

| H/W MAC BIT WIDTH | 16bit / 16bit HW | | |
|---|---|---|---|
| REQUIRED PRECISION | 8bit/8bit | 8bit/16bit | 16bit/16bit |
| Throughput (Performance) | 4X | 2X | 1X |

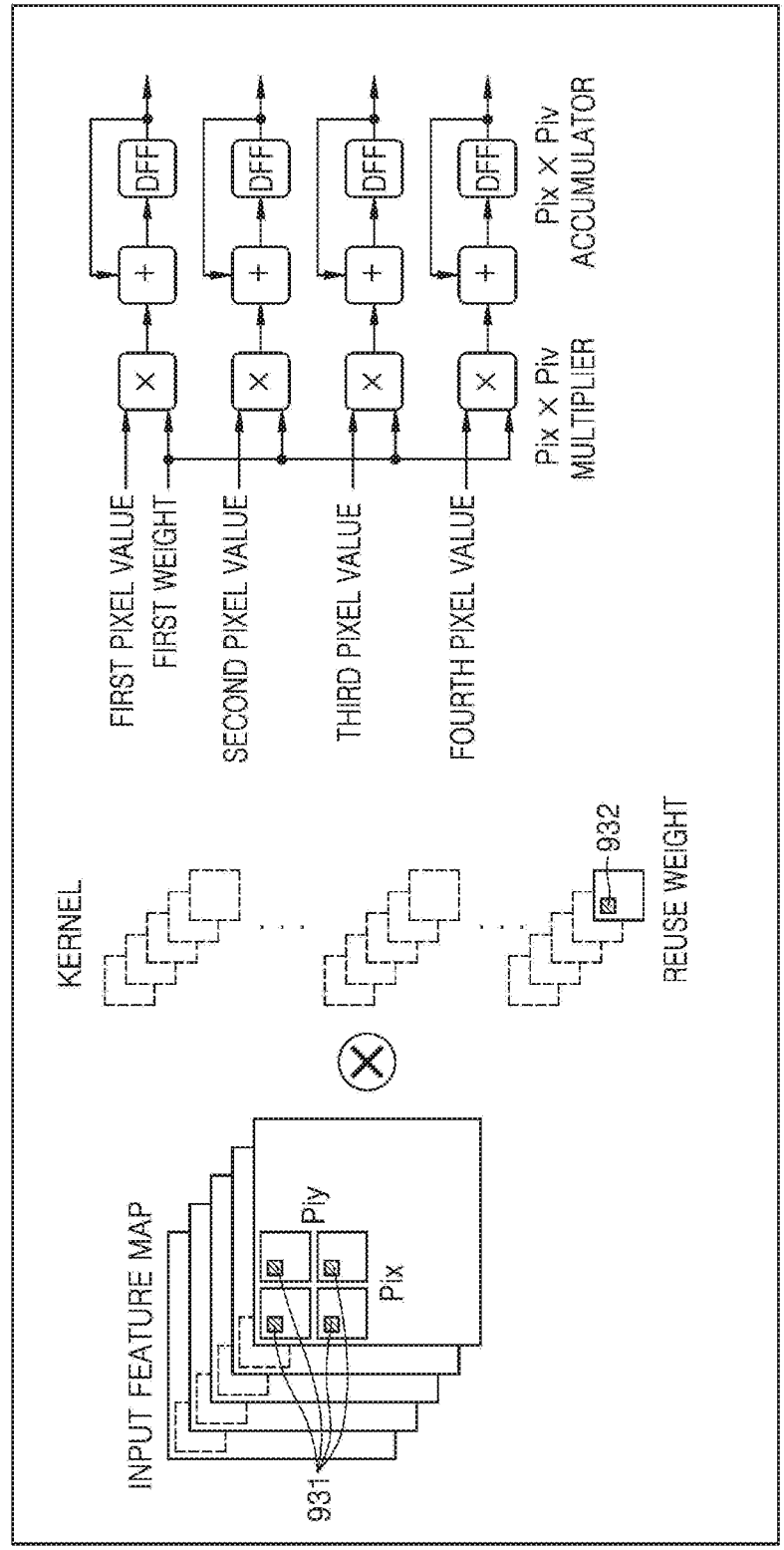

FIG. 16
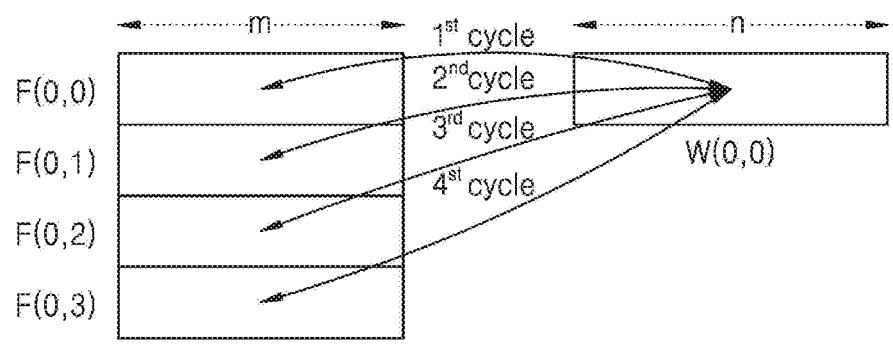
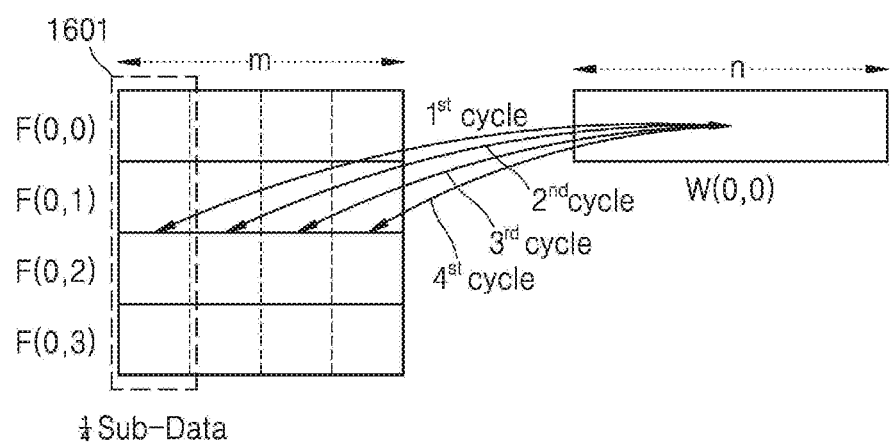

METHOD AND APPARATUS FOR PROCESSING CONVOLUTION OPERATION IN NEURAL NETWORK USING SUB-MULTIPLIERS

CROSS-REFERENCE TO RELATED APPLICATION

This application claims the benefit under 35 USC § 119(a) of Korean Patent Application No. 10-2017-0166203, filed on Dec. 5, 2017, in the Korean Intellectual Property Office, the entire disclosure of which is incorporated herein by reference for all purposes.

BACKGROUND

1. Field

The following description relates to a method and apparatus for processing a convolution operation between a feature map and a kernel in a neural network.

2. Description of Related Art

In neural network technology, studies of analyzing input data using a neural network in various types of electronic systems and extracting valid information are being actively conducted. An apparatus processing a neural network requires a large amount of operations with respect to complicated input data. Accordingly, technology to efficiently process operations for a neural network is desirable to analyze a large amount of input data in real time using a neural network and to extract the desired information. When the neural network is trained, uniform accuracy may be maintained or accuracy may be increased by only using a small number of bits, and the number of bits used by an operator processing the neural network may be variously changed during operation. Various operations in the neural network may be efficiently processed if properties of such a neural network and parallelism of operations performed in the neural network are used together.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of processing a convolution operation in a neural network, the method including determining m first-bit feature map operands and n second-bit weight operands from input feature maps and kernels, respectively, on which the convolution operation is to be performed, wherein m and n are each a natural number, dispatching m×n operand pairs of a feature map operand and a weight operand, which are combined from the first-bit feature map operands and the second-bit weight operands, respectively, to decomposed sub-multipliers in a convolution operator, generating m×n outputs by performing addition and accumulation operations on results of multiplication operations performed by the decomposed sub-multipliers, and obtaining pixel values of output feature maps corresponding to results of the convolution operation based on the m×n outputs.

The first-bit feature map operands and the second-bit weight operands may be respectively determined based on pixel values of the input feature maps and weights of the kernels, which may be processable in parallel.

The first-bit feature map operands may be based on pixel values at different pixel locations in an input feature map from among the input feature maps.

The second-bit weight operands may be based on weights at corresponding locations in different kernels from among the kernels, wherein the different kernels may reference an input channel and different output channels of the input feature map.

The second-bit weight operands may be based on weights at different locations in a kernel from among the kernels, wherein the kernel may references an input channel and any one output channel of the input feature map.

The first-bit feature map operands may be based on pixel values at corresponding pixel locations in different input feature maps from among the input feature maps, wherein the different input feature maps may correspond to different input channels.

The second-bit weight operands may be based on weights at corresponding locations in different kernels from among the kernels, wherein the different kernels may correspond to the different input channels and any one output channel.

The second-bit weight operands may be based on weights at corresponding locations in different kernels from among the kernels, wherein the different kernels may correspond to the different input channels and different output channels.

The decomposed sub-multipliers may respectively correspond to sub-logics of a k-bit multiplier, in response to the convolution operator comprising the k-bit multiplier having full precision of k bits, the first-bit and the second-bit may be each smaller than the k-bit, and each of the decomposed sub-multipliers may correspond to a multiplier of the first-bit or a multiplier of the second-bit.

The first-bit feature map operands and the second-bit weight operands may correspond to k/2-bit operands, each of the decomposed sub-multipliers may correspond to a k/2-bit multiplier, and the operand pairs, in which the first-bit feature map operands and the second-bit weight operands may be mapped to each other, may be respectively dispatched to the decomposed sub-multipliers.

The each of the decomposed sub-multipliers may correspond to a k/2-bit multiplier, operand pairs, in which the first-bit feature map operands and most significant bits of k/2 bits in the second-bit weight operands may be mapped to each other, and operand pairs, in which the first-bit feature map operands and least significant bits of k/2 bits in the second-bit weight operands may be mapped to each other, may be respectively dispatched to the decomposed sub-multipliers, in response to the first-bit feature map operands being k/2-bit operands and the second-bit weight operands being k-bit operands, and operand pairs, in which most significant bits of k/2 bits in the first-bit feature map operands and the second-bit weight operands may be mapped to each other, and operand pairs, in which least significant bits of k/2 bits in the first-bit feature map operands and the second-bit weight operands may be mapped to each other, may be respectively dispatched to the decomposed sub-multipliers, in response to the first-bit feature map operands being k-bit operands and the second-bit weight operands being k/2-bit operands.

Each of the decomposed sub-multipliers may correspond to a k/2-bit multiplier, and operand pairs, in which most significant bits and least significant bits of k/2 bits in the first-bit feature map operands and most significant bits and least significant bits of k/2 bits in the second-bit weight operands may be mapped to each other, may be respectively dispatched to the decomposed sub-multipliers, in response to the first-bit feature map operands and the second-bit weight operands being k-bit operands.

The method may comprise clock-gating a multiplication operation of a sub-multiplier to which a zero operand is dispatched, for zero skipping, in response to the zero operand being present in the m×n operand pairs.

In another general aspect, there is provided an apparatus for processing a convolution operation in a neural network, the apparatus comprising a processor is further configured to determine m first-bit feature map operands and n second-bit weight operands from input feature maps and kernels, respectively, on which the convolution operation is to be performed, wherein m and n may each be a natural number, dispatch m×n operand pairs of a feature map operand and a weight operand, which are combined from the first-bit feature map operands and second-bit weight operands, respectively to decomposed sub-multipliers in a convolution operator, generate m×n outputs by performing addition and accumulation operations on results of multiplication operations performed by the decomposed sub-multipliers, and obtain pixel values of output feature maps corresponding to results of the convolution operation based on the m×n outputs.

The first-bit feature map operands and the second-bit weight operands may be respectively determined based on pixel values of the input feature maps and weights of the kernels, which may be processable in parallel.

The first-bit feature map operands may be based on pixel values at different pixel locations in an input feature map from among the input feature maps.

The second-bit weight operands may be based on weights at corresponding locations in different kernels from among the kernels, wherein the different kernels reference an input channel and different output channels of the input feature map, or the second-bit weight operands may be based on weights at different locations in one kernel from among the kernels, wherein the kernel references an input channel and any one output channel of the one input feature map.

The first-bit feature map operands may be based on pixel values at corresponding pixel locations in different input feature maps from among the input feature maps, wherein the different input feature maps correspond to different input channels.

The second-bit weight operands may be based on weights at corresponding locations in different kernels from among the kernels, wherein the different kernels correspond to the different input channels and any one output channel, or the second-bit weight operands may be based on weights at corresponding locations in different kernels from among the kernels, wherein the different kernels correspond to the different input channels and different output channels.

The decomposed sub-multipliers respectively may correspond to sub-logics of a k-bit multiplier, in response to the convolution operator comprising a k-bit multiplier having full precision of k bits, the first-bit and the second-bit may be each smaller than the k-bit, and each of the decomposed sub-multipliers corresponds to a multiplier of the first-bit or a multiplier of the second-bit.

The first-bit feature map operands and the second-bit weight operands correspond to k/2-bit operands, each of the decomposed sub-multipliers may correspond to a k/2-bit multiplier, and the operand pairs, in which the first-bit feature map operands and the second-bit weight operands may be mapped to each other, may be respectively dispatched to the decomposed sub-multipliers.

Each of the decomposed sub-multipliers may correspond to a k/2-bit multiplier, operand pairs, in which the first-bit feature map operands and most significant bits of k/2 bits in the second-bit weight operands may be mapped to each other, and operand pairs, in which the first-bit feature map operands and least significant bits of k/2 bits in the second-bit weight operands may be mapped to each other, may be respectively dispatched to the decomposed sub-multipliers, in response to the first-bit feature map operands being k/2-bit operands and the second-bit weight operands being k-bit operands, and operand pairs, in which most significant bits of k/2 bits in the first-bit feature map operands and the second-bit weight operands may be mapped to each other, and operand pairs, in which least significant bits of k/2 bits in the first-bit feature map operands and the second-bit weight operands may be mapped to each other, may be respectively dispatched to the decomposed sub-multipliers, in response to the first-bit feature map operands being k-bit operands and the second-bit weight operands being k/2-bit operands.

Each of the decomposed sub-multipliers corresponds to a k/2-bit multiplier, and operand pairs, in which most significant bits and least significant bits of k/2 bits in the first-bit feature map operands and most significant bits and least significant bits of k/2 bits in the second-bit weight operands may be mapped to each other, may be respectively dispatched to the decomposed sub-multipliers, in response to the first-bit feature map operands and the second-bit weight operands may be k-bit operands.

The processor may be configured to, clock-gate a multiplication operation of a sub-multiplier to which a zero operand is dispatched, for zero skipping, in response to a zero operand being present in the m×n operand pairs.

The apparatus may include a memory storing instructions that, when executed, configure the processor to determine the m first-bit feature map operands and the n second-bit weight operands, dispatch the m×n operand pairs, generate the m×n outputs, and obtain the output feature maps.

Other features and aspects will be apparent from the following detailed description, the drawings, and the claims.

BRIEF DESCRIPTION OF THE DRAWINGS

FIG. 1 is a diagram illustrating an example of the architecture of a neural network.

FIGS. 9A through 9D are diagrams illustrating examples for describing types of operand pairs determined such that a convolution operation using parallelism in a neural network is performed.

FIG. 16 is a diagram illustrating an example for describing determining of a zero operand.

Figure 2A:
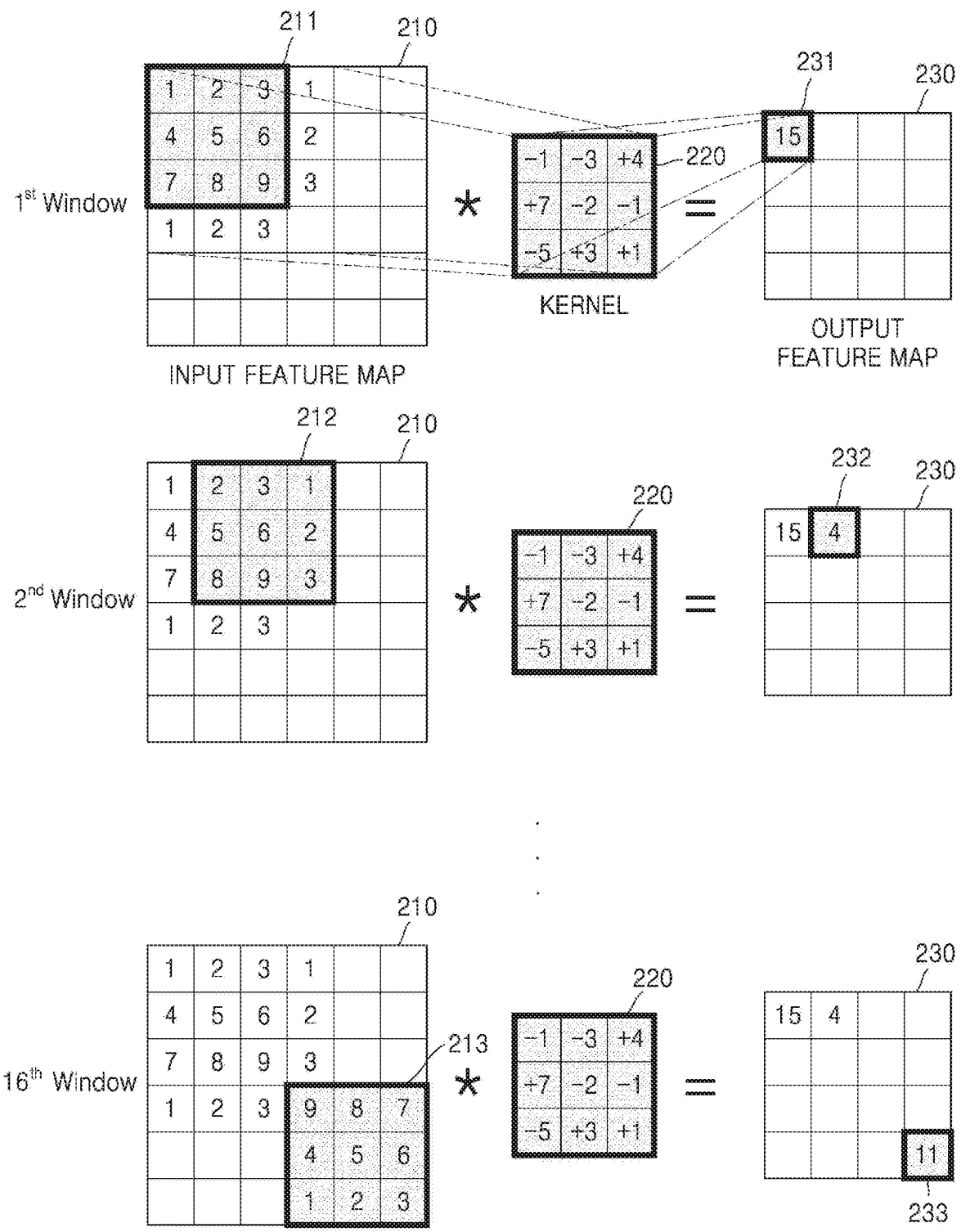
FIGS. 2A and 2B are diagrams illustrating examples for describing a convolution operation in a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

In the specification, when a region is "connected" to another region, the regions may not only be "directly connected", but may also be "electrically connected" via another device therebetween. Also, when a region "includes" an element, the region may further include another element instead of excluding the other element, unless otherwise differently stated.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

FIG. 1 is a diagram illustrating an example of the architecture of a neural network 1.

Referring to FIG. 1, the neural network 1 may be architecture of a deep neural network (DNN) or an n-layer neural network. The DNN or n-layer neural network may correspond to a convolutional neural network (CNN), a recurrent neural network (RNN), a deep belief network, a fully connected network, a bi-directional neural network, a restricted Boltzman machine, or may include different or overlapping neural network portions respectively with full, convolutional, recurrent, and/or bi-directional connections. For example, the neural network 1 may be embodied as a CNN, but is not limited thereto. In FIG. 1, some convolution layers of a CNN corresponding to an example of the neural network 1 are illustrated, but the CNN may further include, in addition to the illustrated convolution layers, a pooling layer or a fully connected layer.

The neural network 1 may be embodied as an architecture having a plurality of layers including an input image, feature maps, and an output. In the neural network 1, a convolution operation is performed on the input image with a filter referred to as a kernel, and as a result, the feature maps are output. The convolution operation is performed again on the output feature maps as input feature maps, with a kernel, and new feature maps are output. When the convolution operation is repeatedly performed as such, a recognition result with respect to features of the input image may be finally output through the neural network 1.

In another example, the neural network 1 may include an input source sentence (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network 1.

For example, when an input image having a 24×24 pixel size is input to the neural network 1 of FIG. 1, the input image may be output as feature maps of four channels each having a 20×20 pixel size, through a convolution operation with a kernel. The sizes of the 20×20 feature maps may be reduced through the repeated convolution operations with the kernel, and in an example, features each having a 1×1 pixel size may be output. In the neural network 1, a convolution operation and a sub-sampling (or pooling) operation may be repeatedly performed in several layers so as to filter and output robust features, which may represent the entire input image, from the input image, and derive the recognition result of the input image through final features that are output.

Figure 2B:
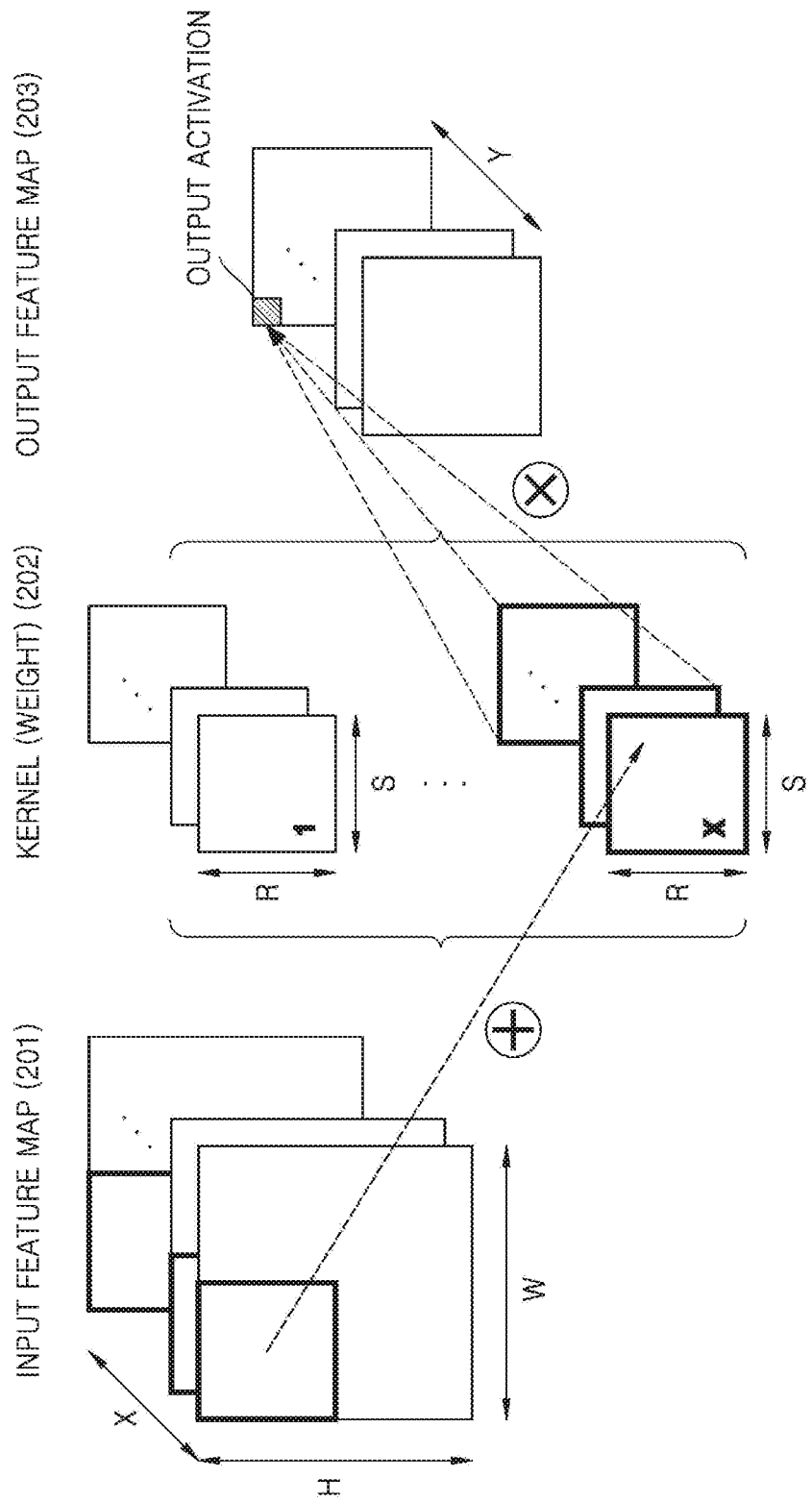

FIGS. 2A and 2B are diagrams illustrating examples for describing a convolution operation in a neural network.

In the example of FIG. 2A, an input feature map 210 has a 6×6 pixel size, an original kernel 220 has a 3×3 pixel size, and an output feature map 230 has a 4×4 pixel size, but sizes are not limited thereto, and the neural network may include feature maps and kernels having various sizes. Also, values defined in the input feature map 210, the original kernel 220, and the output feature map 230 are only examples, and are not limited thereto.

The original kernel 220 performs a convolution operation while sliding on the input feature map 210 in a window (or tile) unit having a 3×3 pixel size. The convolution operation is an operation in which each pixel value of the output feature map 230 is obtained by adding values obtained by multiplying pixel values of any window of the input feature map 210 by a weight of each element at a corresponding location in the original kernel 220. In detail, the original kernel 220 may first perform a convolution operation with a first window 211 of the input feature map 210. In other words, pixel values of 1, 2, 3, 4, 5, 6, 7, 8, and 9 of the first window 211 are respectively multiplied by weights of −1, −3, +4, +7, −2, −1, −5, +3, and +1 of elements of the original kernel 220, and as a result, values of −1, −6, 12, 28, −10, −6, −35, 24, and 9 are obtained. The values of −1, −6, 12, 28, −10, −6, −35, 24, and 9 are added to obtain a value of 15, and accordingly, a pixel value 231 of a first row and a first column of the output feature map 230 is determined to be the value of 15. Here, the pixel value 231 of the first row and the first column of the output feature map 230 corresponds to the first window 211.

Similarly, a convolution operation is performed between a second window 212 of the input feature map 210 and the original kernel 220, and thus a pixel value 232 of the first row and a second column of the output feature map 230 is determined to be 4. A convolution operation is performed between a sixteenth window 213, i.e., a last window of the input feature map 210, and the original kernel 220, and thus a pixel value 233 of a fourth row and a fourth column of the output feature map 230 is determined to be 11.

In other words, a convolution operation between one input feature map 210 and one original kernel 220 may be processed by repeatedly performing multiplication of values of elements of the input feature map 210 by values of elements of the original kernel 220, which correspond to each other, and addition of multiplication results, and the output feature map 230 is generated as a result of the convolution operation.

A two-dimensional (2D) convolution operation has been described with reference to FIG. 2A. In another example, a three-dimensional (3D) convolution operation may be performed, wherein input feature maps, kernels, and output feature maps of a plurality of channels exist, as will be described with reference to FIG. 2B.

Referring to FIG. 2B, there are X channels in input feature maps 201, and the input feature map 201 of each channel may have a size of H rows and W columns, wherein X, W, and H are each a natural number. Each of kernels 202 may have a size of R rows and S columns, and have the number of channels corresponding to the number X of channels of the input feature maps 201 and the number Y of channels of output feature maps 203, wherein R, S, and Y are each a natural number. The output feature maps 203 are generated via a 3D convolution operation between the input feature maps 201 and the kernels 202, and Y channels may exist in the output feature maps 203 via the 3D convolution operation.

A process of generating an output feature map via a convolution operation between one input feature map and one kernel is as described above with reference to FIG. 2A, and the 2D convolution operation described in FIG. 2A is repeatedly performed between all channels of the input feature maps 201 and all channels of the kernels 202 to generate the output feature maps 203 of all channels.

Figure 3:
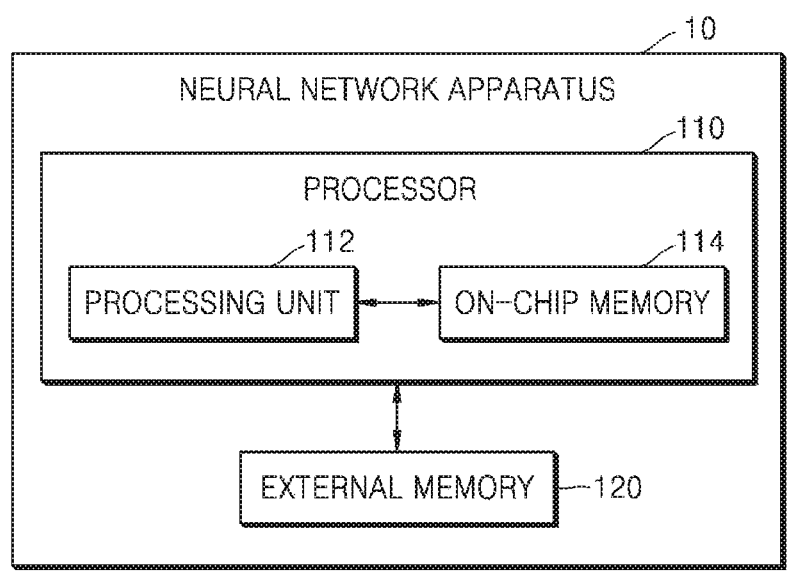
FIG. 3 is a diagram illustrating an example of a hardware configuration of a neural network apparatus.

FIG. 3 is a diagram illustrating an example of a hardware configuration of a neural network apparatus 10.

The neural network apparatus 10 may be embodied as any one of various types of devices, such as a personal computer (PC), a server device, a mobile device, and an embedded device, and for example, may correspond to a smartphone, a tablet device, an augmented reality (AR) device, an Internet of Things (IoT) device, an autonomous vehicle, a robotic device, or a medical device, which performs voice recognition, image recognition, and image classification using a neural network, but is not limited thereto. In another example, the neural network apparatus 10 may correspond to an exclusive hardware (HW) accelerator mounted on such a device, and may be an HW accelerator, such as a neural processing unit (NPU), a tensor processing unit (TPU), or a neural engine, which is an exclusive module for driving a neural network, but is not limited thereto.

In an example, the neural network apparatus 10 may be configured to process image data in an input image to the neural network apparatus 10 to extract information about the input image for image recognition, image verification, or image classification. For example, the neural network apparatus 10 performs convolution with respect to image data, or one or more input feature maps corresponding to the input image, to generate an output feature map. The neural network apparatus 10 generates an image recognition output, an image verification indication, or an image classification output based on information in the output feature map. That is, the neural network apparatus 10 may indicate the result of the image recognition, verification or classification, either explicitly or implicitly. For example, the recognized, verified, or classified image may be explicitly indicated through display in text form on a display of the neural network apparatus 10 or audibly fed back to the user or another user, or implicit indications may be provided through additional operations, or selective non-operations, of the neural network apparatus 10 based on the result of the image recognition, verification, or classification.

According to another example, the neural network apparatus 10 may be configured to process audio data in voice entry to extract information about the voice entry for voice recognition or speech-to-text translation of the voice entry. For example, the neural network apparatus 10 performs convolution with respect to one or more input feature maps corresponding to the voice entry to generate an output feature map. The neural network apparatus 10 generates a voice recognition output or a text translation output based on information in the output feature map. That is, the neural network apparatus 10 may indicate the result of the speech recognition or speech-to-text translation, either explicitly or implicitly. For example, the recognized speech may be explicitly indicated through display in text form on a display of the neural network apparatus 10 or audibly fed back to the user or another user, or implicit indications may be provided through additional operations, or selective non-operations, of the neural network apparatus 10 based on the result of the speech recognition. For example, the neural network apparatus 10 may further perform a translation operation based on the recognition result, unlock the neural network apparatus 10 when the neural network apparatus 10 is a mobile device, or perform other operations of such an electronic device example.

In comparison with conventional neural network apparatuses, the neural network apparatus 10 quickly and efficiently processes a convolution operation in a neural network by suitably using a dispatching pattern according to precisions (or bit widths) of individual operands and parallelism of individual convolution operations to be processed in the neural network. Thus, making optimal use of available hardware resources for performing convolutions.

Referring to FIG. 3, the neural network apparatus 10 includes a processor 110 and an external memory 120. In FIG. 3, only components of the neural network apparatus 10 related to the current embodiment are illustrated. The neural network apparatus 10 may include general-purpose components other than those shown in FIG. 3.

The processor 110 controls overall functions for executing the neural network apparatus 10 in a neural network. In an example, the processor 110 controls the neural network apparatus 10 by executing programs stored in the external memory 120 of the neural network apparatus 10. In an example, the processor 110 is embodied as a central processing unit (CPU), a graphics processing unit (GPU), or an application processor (AP) included in the neural network apparatus 10, but is not limited thereto.

The external memory 120 is hardware storing various types of data processed in the neural network apparatus 10, and the external memory 120 may store data processed or to be processed by the neural network apparatus 10. Also, the external memory 120 may store applications or drivers to be driven by the neural network apparatus 10. The external memory 120 may include random-access memory (RAM), such as dynamic random-access memory (DRAM) or static random-access memory (SRAM), read-only memory (RAM), electrically erasable programmable read-only memory (EEPROM), a CD-ROM, a Blu-ray disk, optical disk storage, a hard disk drive (HDD), a solid state drive (SSD), or a flash memory. Further examples of the memory 120 are described below.

The processor 110 reads or writes neural network data, for example, image data, voice data, feature map data, or kernel data, from or to the external memory 120, and executes a neural network by using the read/written neural network data. When the neural network is executed, the processor 110 drives a convolution operator provided therein to repeatedly perform a convolution operation between an input feature map and a kernel, thereby generating data related to an output feature map. Here, an operation count of the convolution operation may be determined based on various factors, such as the number of channels of the input feature map, the number of channels of the kernel, the size of the input feature map, the size of the kernel, and precision of a value. Compared to the neural network 1 of FIG. 1, a neural network driven in the neural network apparatus 10 may be embodied in a more complicated architecture. Accordingly, the processor 110 performs convolution operations of a very large operation count up to hundreds of millions to tens of billions, and a frequency of the processor 110 accessing the external memory 120 for convolution operations is also remarkably increased. An embedded device or a mobile device, such as a smartphone, a tablet device, or a wearable device, which has a relatively low processing performance, needs to reduce a load of such an operation count.

In an example, the processor 110 includes a processing unit 112 performing a processing function, and an on-chip memory 114 performing a cache function.

The processing unit 112 processes a convolution operation between an input feature map and a kernel by using pixel values of input feature maps and weights of kernels stored (or buffered) in the on-chip memory 114 from the external memory 120. The processor 110 may include at least one processing unit 112 and at least one on-chip memory 114, and a convolution operation may be efficiently performed as each of the at least one processing unit 112 and each of the at least one on-chip memory 114 are used to independently perform the convolution operation in parallel.

The processing unit 112 of the processor 110 may include a logic circuit embodying a convolution operator for a convolution operation. The convolution operator is an operator including a combination of a multiplier, an adder, and an accumulator. The multiplier in the convolution operator may include a combination of a plurality of sub-multipliers, and the adder may also include a combination of a plurality of sub-adders.

The processing unit 112 determines m first-bit feature map operands and n second-bit weight operands respectively from input feature maps and kernels, on which a convolution operation is to be performed, wherein m and n are each a natural number. Here, m and n may be the same or different natural numbers, and values of the first-bit and second-bit may be the same or different natural numbers.

The processing unit 112 may determine feature map operands and weight operands based on pixel values of input feature maps and weights of kernels, which are capable of being processed in parallel.

For example, the feature map operands may be based on pixel values at different pixel locations in one input feature map among the input feature maps, and in this case, the weight operands may be based on weights at corresponding locations in different kernels among the kernels, the different kernels having references of an input channel and different output channels of the one input feature map, or based on weights at different locations in one kernel among the kernels, the one kernel having a reference of an input channel and one of output channels of the one input feature map.

As another example, the feature map operands may be based on pixel values at corresponding pixel locations in different input feature maps among the input feature maps, the different input feature maps having references of different input channels, and in this case, the weight operands may be based on weights at corresponding locations in different kernels among the kernels, the different kernels having references of different input channels and one of output channels, or based on weights at corresponding locations in different kernels among the kernels, the different kernels having references of different input channels and different output channels.

However, the above examples are some types of operands, which may be determined by the processing unit 112, and the processing unit 112 may determine other various types of operands based on input feature maps and kernels.

The processing unit 112 may determine precisions of each of the multiplier, adder, and accumulator in the convolution operator, and precisions of feature map and weight operands, and determine how to (for example, into which precision (bit widths)) decompose the multiplier, adder, and accumulator in the convolution operator based on the precision (bit widths) of the feature map and weight operands.

For example, when the convolution operator includes a k-bit multiplier having full precision of k bits, wherein k is a natural number, the k-bit multiplier may be logically or physically decomposed into sub-multipliers respectively corresponding to sub-logics of the k-bit multiplier. Here, the first-bit and the second-bit, which are the numbers of bits in the feature map and weight operands, may each be less than the k bits, and each of the decomposed sub-multipliers may correspond to a multiplier of the first-bit or a multiplier of the second-bit. However, an embodiment is not limited thereto.

In an example, the processing unit 112 stores the feature map and weight operands in the on-chip memory 114. The processing unit 112 dispatches m×n operand pairs of a feature map operand and a weight operand, which are combined from the first-bit feature map operands and second-bit weight operands stored in the on-chip memory 114, respectively to the decomposed sub-multipliers in the convolution operator.

For example, each of the first-bit feature map operands and the second-bit weight operands corresponds to a k/2-bit operand, and each of the decomposed sub-multipliers corresponds to a k/2-bit multiplier. In this case, operand pairs, in which the first-bit feature map operands and the second-bit weight operands are mapped to each other, are respectively dispatched to the decomposed sub-multipliers.

As another example, each of the decomposed sub-multipliers may correspond to a k/2-bit multiplier, and when the first-bit feature map operands are k/2-bit operands and the second-bit weight operands are k-bit operands, operand pairs, in which the first-bit feature map operands and most significant bits (MSBs) of k/2 bits in the second-bit weight operands are mapped to each other, and operand pairs, in which the first-bit feature map operands and least significant bits (LSBs) of k/2 bits in the second-bit weight operands are mapped to each other, may be respectively dispatched to the decomposed sub-multipliers.

As another example, each of the decomposed sub-multipliers may correspond to a k/2-bit multiplier, and when the first-bit feature map operands are k-bit operands and the second-bit weight operands are k/2-bit operands, operand pairs, in which MSBs of k/2 bits in the first-bit feature map operands and the second-bit weight operands are mapped to each other, and operand pairs, in which LSBs of k/2 bits in the first-bit feature map operands and the second-bit weight operands are mapped to each other, may be respectively dispatched to the decomposed sub-multipliers.

As another example, each of the decomposed sub-multipliers may correspond to a k/2-bit multiplier, and when the first-bit feature map operands and the second-bit weight operands are k-bit operands, operand pairs, in which MSBs and LSBs of k/2 bits in the first-bit feature map operands and MSBs and LSBs of k/2 bits in the second-bit weight operands are mapped to each other, are respectively dispatched to the decomposed sub-multipliers.

However, such operand dispatching patterns are only examples, and the processing unit 112 may dispatch operands to sub-multipliers in various patterns.

The processing unit 112 generates m×n outputs by performing addition and accumulation operations on results of multiplication operations performed by the decomposed sub-multipliers.

The processing unit 112 obtains pixel values of output feature maps, which correspond to results of the convolution operation, based on the m×n outputs.

Meanwhile, when a zero operand exists in the dispatched m×n operand pairs, the processing unit 112 may clock-gate a multiplication operation of a sub-multiplier to which the zero operand is dispatched, for zero skipping.

The processing unit 112 may include a dispatcher that dispatches, as described above, various operands, such as pixel values of input feature maps and weights of kernels, to the convolution operator. The dispatcher dispatches, to the on-chip memory 114, operands, such as pixel values and weights required by the processing unit 112 to perform the convolution operation, from data of pixel values of input feature maps and weights of kernels, wherein the data is stored in the external memory 120. The dispatcher also dispatches the operands dispatched to the on-chip memory 114 again to the convolution operator for the convolution operation.

Operands, such as pixel values and weights, used in a neural network may correspond to pieces of data having various precisions (or various bit widths). Accordingly, the processing unit 112 and the on-chip memory 114 may variously and dynamically adjust precisions (or bit widths) of operands to be dispatched to the convolution operator of the processing unit 112 and the on-chip memory 114 such that a convolution operation using data of various precisions (or various bit widths) may be performed.

The processing unit 112 may efficiently process a convolution operation in a neural network by suitably using a dispatching pattern according to precisions (or bit widths) of individual operands and parallelism of individual convolution operations to be processed in the neural network.

Figure 4A:
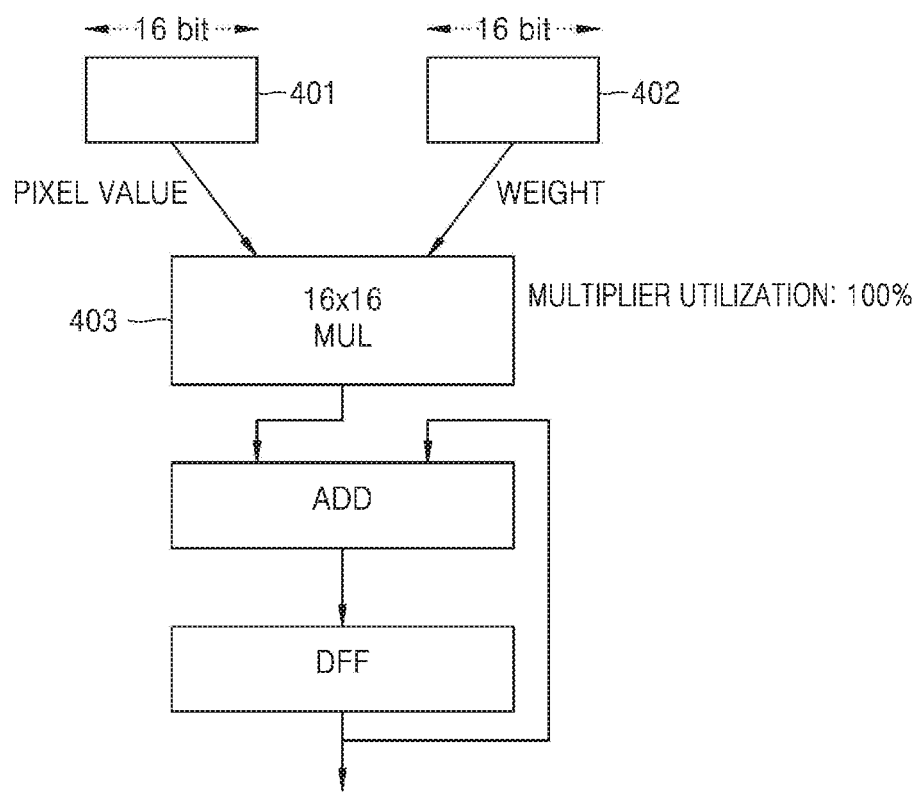
FIGS. 4A and 4B are diagrams illustrating examples for comparing multiplier utilizations according to different precisions (or bit widths) of a 16-bit (16 bit×16 bit) multiplier.
Figure 4B:
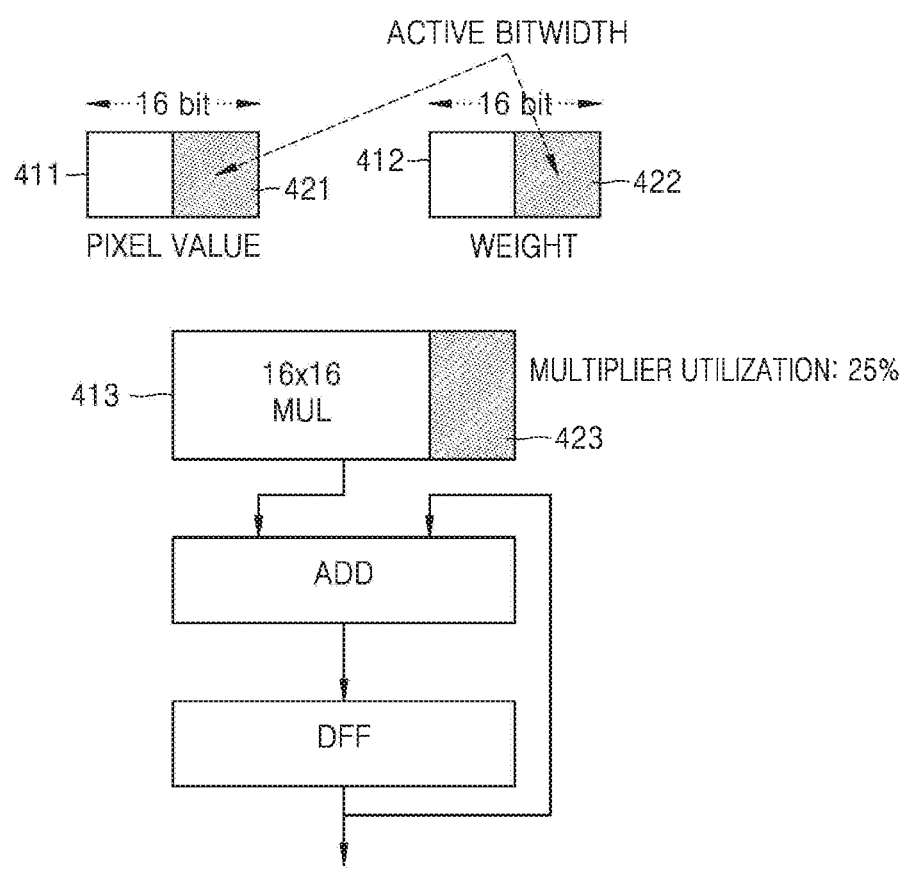

FIGS. 4A and 4B are diagrams illustrating examples for comparing multiplier utilizations according to different precisions (or bit widths) of a 16-bit (16 bit×16 bit) multiplier.

Referring to FIG. 4A, when a pixel value 401 and a weight 402, on which a convolution operation is to be performed, both correspond to 16-bit operands, a 16-bit multiplier 403 in a convolution operator performs a multiplication operation between a 16-bit feature map operand (i.e., the pixel value 401) and a 16-bit weight operand (i.e., the weight 402). Accordingly, in FIG. 4A, utilization of the 16-bit multiplier 403 is 100%.

Referring to FIG. 4B, when a pixel value 411 and a weight 412, on which a convolution operation is to be performed, both correspond to 8-bit operands, a 16-bit multiplier 413 in a convolution operator performs a multiplication operation between an 8-bit feature map operand (i.e., the pixel value 411) and an 8-bit weight operand (i.e., the weight 412). Accordingly, in FIG. 4B, utilization of the 16-bit multiplier 413 is only 25% of resources 423, unlike FIG. 4A. In other words, the remaining 75% resources of the 16-bit multiplier 413 are in an idle state, and thus an operation efficiency of the convolution operator is low.

Figure 5A:
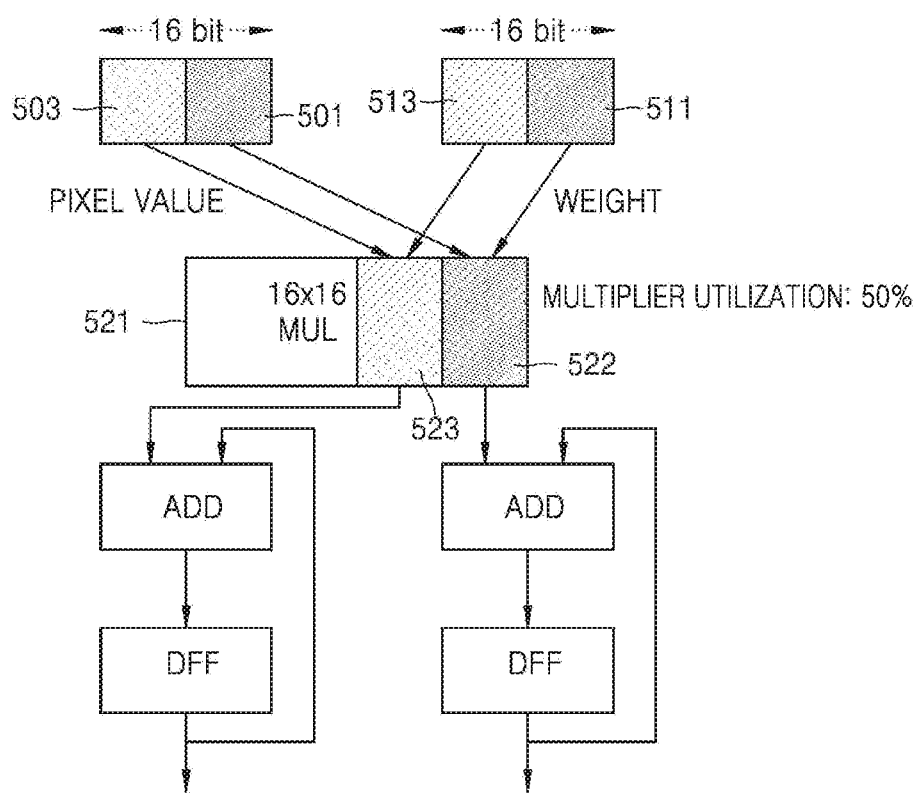
FIGS. 5A and 5B are diagrams illustrating examples for comparing multiplier utilizations when four 8-bit operands are processed in parallel by a 16-bit multiplier.
Figure 5B:
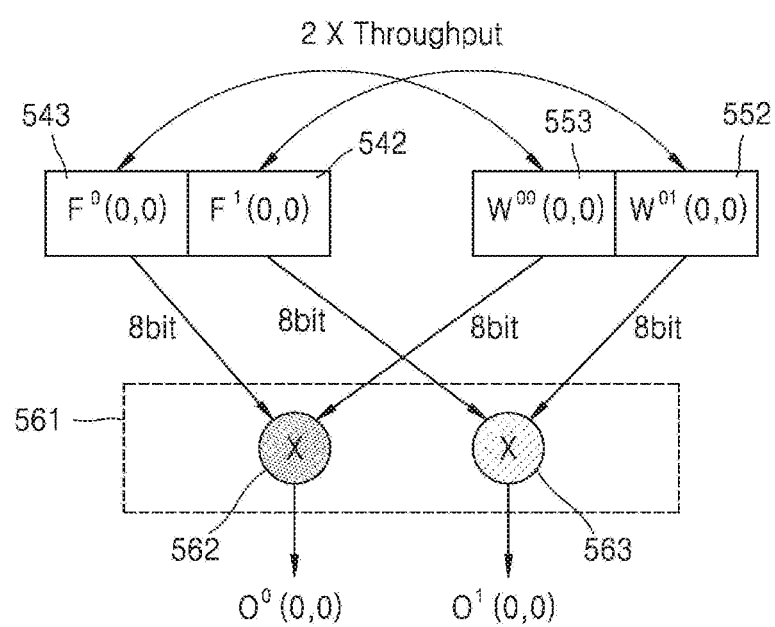

FIGS. 5A and 5B are diagrams illustrating examples for comparing multiplier utilizations when four 8-bit operands are processed in parallel by a 16-bit multiplier.

Referring to FIG. 5A, an operand pair of an 8-bit feature map operand 501 (i.e., a pixel value) and an 8-bit weight operand 511, and another operand pair of an 8-bit feature map operand 503 (i.e., a pixel value) and an 8-bit weight operand 513 may be dispatched to a 16-bit multiplier 521 for a parallel convolution operation. In this case, only 50% of resources 522 and 523 of the 16-bit multiplier 521 are used.

Referring to FIG. 5B, the 8-bit feature map operand 501 corresponds to a pixel value ($F^1(0,0)$) 542 at a (0,0) location in an input feature map of a first input channel, the 8-bit feature map operand 503 corresponds to a pixel value ($F^0(0,0)$) 543 at a (0,0) location in an input feature map of a $0^{th}$ input channel. The 8-bit weight operand 511 corresponds to a weight ($W^{01}(0,0)$) 552 at a (0,0) location of a kernel of the first input channel and a $0^{th}$ output channel, and the 8-bit weight operand 513 may correspond to a weight ($W^{00}(0,0)$) 553 at a (0,0) location of a kernel of the $0^{th}$ input channel and the $0^{th}$ output channel. The pixel value ($F^0(0,0)$) 543 and the weight ($W^{00}(0,0)$) 553 are dispatched to a sub-multiplier 562 in a 16-bit multiplier 561, and the sub-multiplier 562 performs a multiplication operation of the pixel value ($F^0(0,0)$) 543 and the weight ($W^{00}(0,0)$) 553. Then, the pixel value ($F^1(0,0)$) 542 and the weight ($W^{01}(0, 0)$) 552 are dispatched to a sub-multiplier 563, and the sub-multiplier 563 performs a multiplication operation of the pixel value ($F^1(0,0)$) 542 and the weight ($W^{01}(0,0)$) 552. Results of the multiplication operations of the sub-multipliers 562 and 563 are independently processed and are output as a pixel value ($O^0(0,0)$) of an output feature map of the $0^{th}$ output channel and a pixel value ($O^1(0,0)$) of an output feature map of a first output channel, respectively.

In other words, since four 8-bit operands, i.e., the 8-bit feature map operands 501 and 503 and the 8-bit weight operands 511 and 513, are input to the 16-bit multiplier 521, but only two outputs, i.e., the pixel values ($O^0(0,0)$) and ($O^1(0,0)$), are output, all resources of the 16-bit multiplier 521 are not used, and accordingly, an operation efficiency of a convolution operator may be low.

As a result, according to FIGS. 4B, 5A, and 5B, since a maximum bit width (for example, 16 bits) of a multiplier is not used, multiplier utilization and efficiency of a convolution operator are low. In FIG. 4A, since all operands are not fixed to 16 bits in a neural network, a 16-bit multiplier may not be always used at a maximum bit width. Accordingly, a method of increasing utilization of a multiplier by efficiently dispatching operands within a maximum bit width of the multiplier increases efficiency of a convolution operation.

Figures 6, 7A, 7B:
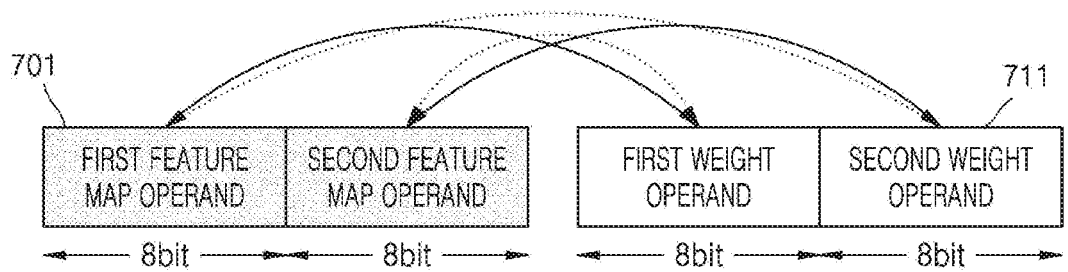
FIG. 6 is a table illustrating an example for comparing circuit areas and energy consumptions according to multiplier types.
FIG. 7A is a diagram illustrating an example for describing multiplication operations of feature map operands and weight operands.
FIG. 7B is a table illustrating an example for comparing performances of a multiplier according to various precisions of operands.

FIG. 6 is a table illustrating an example for comparing circuit areas and energy consumptions according to multiplier types.

Referring to FIG. 6, an 8-bit (8×8) multiplier may occupy about 4 times larger circuit area and have 5 times higher energy consumption than a 4-bit (4×4) multiplier. Also, compared to the 4-bit multiplier, a 16-bit multiplier may occupy about 15 times larger circuit area and 21 times higher energy consumption. In other words, when a precision (a bit width) of a multiplier increases, not only a circuit area is increased, but also energy consumption is largely increased. Accordingly, when a convolution operator includes a multiplier having high precision, all resources of the multiplier may be increased to increase an operation performance of the convolution operator.

FIG. 7A is a diagram illustrating an example for describing multiplication operations of feature map operands and weight operands.

Referring to FIG. 7A, the processor 110 of FIG. 3 determines first-bit feature map operands and second-bit weight operands respectively from input feature maps and kernels, on which a convolution operation is to be performed. In an example, the first-bit and the second-bit may both be 8 bits, but are not limited thereto.

For example, the processing unit 112 of FIG. 3 of the processor 110 may read 8-bit feature map operands and 8-bit weight operands from the external memory 120 of FIG. 3, and dispatch (store) the 8-bit feature map operands and the 8-bit weight operands to (in) the on-chip memory 114 of FIG. 3. In an example, the processing unit 112 may dispatch (store) an 8-bit first feature map operand and an 8-bit second feature map operand to (in) a 16-bit storage area 701 for feature map operands, the 16-bit storage area 701 being assigned to the on-chip memory 114. Also, the processing unit 112 may dispatch (store) an 8-bit first weight operand and an 8-bit second weight operand to (in) a 16-bit storage area 711 for weight operands, the 16-bit storage area 711 being assigned to the on-chip memory 114.

An operand pair of the first feature map operand and the first weight operand, an operand pair of the first feature map operand and the second weight operand, an operand pair of the second feature map operand and the first weight operand, and an operand pair of the second feature map operand and the second weight operand may each be an operand pair to be processed during a convolution operation between an input feature map and a kernel. In addition, such operand pairs may be operand pairs capable of being processed in parallel during the convolution operation.

In other words, operands are dispatched to make full use of parallelism of a convolution operation, and when operand pairs are dispatched to a multiplier to make full use of multiplier resources in a convolution operator, the convolution operation may be efficiently processed.

FIG. 7B is a table illustrating an example for comparing performances of a multiplier according to various precisions of operands. Referring to FIG. 7B, when a 16-bit operand pair is processed by a 16-bit multiplier, only one output (1× throughput) may be obtained, but when four 8-bit operand pairs are processed by the 16-bit multiplier as in FIG. 7B, four independent outputs (4× throughput) may be obtained.

Figure 8A:
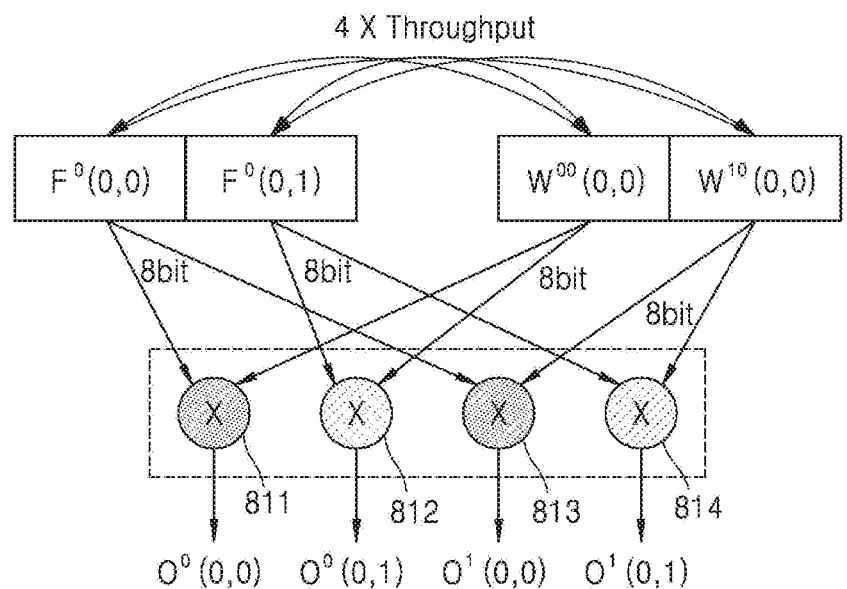
FIG. 8A is a diagram illustrating an example for describing multiplication operations with respect to operand pairs in which feature map operands and weight operands of a neural network are combined.

FIG. 8A is a diagram illustrating an example for describing multiplication operations with respect to operand pairs in which feature map operands ($F^0(0,0)$ and $F^0(0,1)$) and weight operands ($W^{00}(0,0)$ and $W^{01}(0,0)$) of a neural network are combined.

Referring to FIG. 8A, the feature map operands ($F^0(0,0)$ and $F^0(0,1)$) and the weight operands ($W^{00}(0,0)$ and $W^{01}(0, 0)$) are each 8 bits, and the multiplication operations are performed by a 16-bit multiplier. Meanwhile, the 16-bit multiplier may be decomposed into four independent sub-multipliers 811 through 814.

An operand pair of the feature map operand ($F^0(0,0)$) and the weight operand ($W^{00}(0,0)$), an operand pair of the feature map operand ($F^0(0,0)$) and the weight operand ($W^{10}(0,0)$), an operand pair of the feature map operand ($F^0(0,1)$) and the weight operand ($W^{10}(0,0)$), and an operand pair of the feature map operand ($F^0(0,1)$) and the weight operand ($W^{10}(0,0)$) may each be an operand pair to be processed during a convolution operation between an input feature map and a kernel.

These four operand pairs are respectively dispatched to the four sub-multipliers 811 through 814, and the sub-multipliers 811 through 814 independently perform multiplication operations on the operand pairs. After the multiplication operation, four independent outputs ($O^0(0,0)$, $O^0(0,1)$, $O^1(0,0)$, and $O^1(0,1)$) may be obtained through an addition or accumulation operation. In other words, in FIG. 5B, only two outputs ($O^0(0,0)$ and $O^1(0,0)$) are obtained by performing a multiplication operation on two operand pairs, but as illustrated in FIG. 8A, when operand pairs are suitably dispatched to sub-multipliers to make full use of parallelism of a convolution operation in a neural network, the convolution operation is efficiently processed.

Figure 8B:
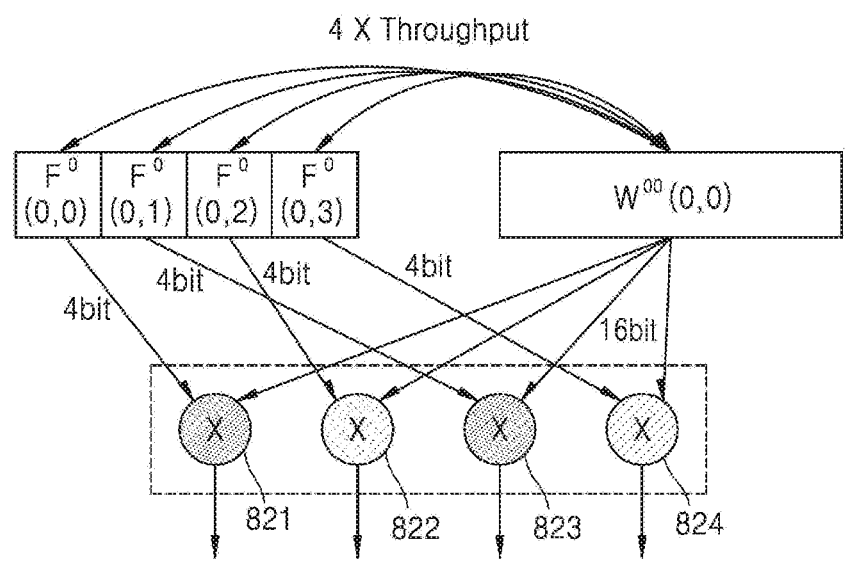
FIG. 8B is a diagram illustrating an example for describing multiplication operations with respect to operand pairs in which feature map operands and a weight operand of a neural network are combined.

FIG. 8B is a diagram illustrating an example for describing multiplication operations with respect to operand pairs in which feature map operands ($F^0(0,0)$, $F^0(0,1)$, $F^0(0,2)$, and $F^0(0,3)$) and a weight operand ($W^{00}(0,0)$) of a neural network are combined.

Referring to FIG. 8B, the feature map operands ($F^0(0,0)$, $F^0(0,1)$, $F^0(0,2)$, and $F^0(0,3)$) are each 4 bits, the weight operand ($W^{00}(0,0)$) is 16 bits, and the multiplication operations are performed by a 16-bit multiplier. The 16-bit multiplier may be decomposed into four independent 8-bit (8×8) sub-multipliers 821 through 824.

An operand pair of the feature map operand ($F^0(0,0)$) and the weight operand ($W^{00}(0,0)$), an operand pair of the feature map operand ($F^0(0,1)$) and the weight operand ($W^{00}(0,0)$) an operand pair of the feature map operand ($F^0(0,2)$) and the weight operand $W^{00}(0,0)$) and an operand pair of the feature map operand ($F^0(0,3)$) and the weight operand ($W^{00}(0,0)$) may each be an operand pair to be processed during a convolution operation between an input feature map and a kernel.

Similarly, these four operand pairs are respectively dispatched to the four sub-multipliers 821 through 824, and the sub-multipliers 821 through 824 independently perform multiplication operations on the operand pairs to obtain four independent outputs. Thus, as illustrated in FIG. 8A, the convolution operation may be efficiently processed by making full use of parallelism of a convolution operation in a neural network.

FIGS. 9A through 9D are diagrams illustrating examples for describing types of operand pairs determined such that a convolution operation using parallelism in a neural network is performed.

Figure 9A:
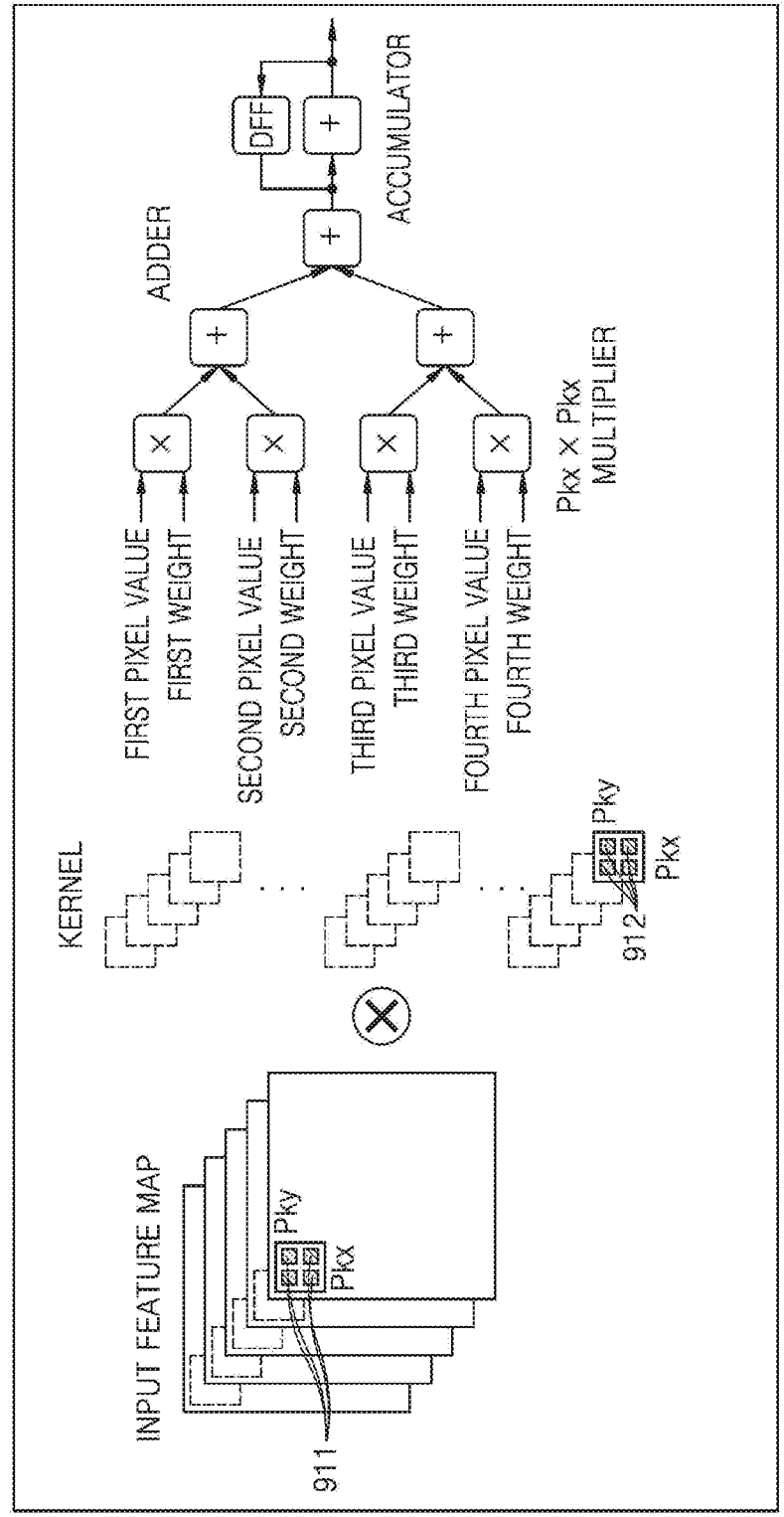

Referring to FIG. 9A, feature map operands that are determined to be capable of being processed in parallel by the processing unit 112 of the processor 110 of FIG. 3 may be based on pixel values 911, i.e., Pixel-1, Pixel-2, Pixel-3 and Pixel-4, at different pixel locations in any one of input feature maps. Also, weight operands that are determined to be capable of being processed in parallel may be based on weights 912, i.e., Weight-1, Weight-2, Weight-3 and Weight-4, at different locations in any one of kernels, which has a reference of an input channel and any one output channel of the input feature map.

A multiplier is decomposed into sub-multipliers. A dispatcher included in the processing unit 112 of FIG. 3 dispatches four operand pairs (an operand pair of Pixel-1 and Weight-1, an operand pair of Pixel-2 and Weight-2, an operand pair of Pixel-3 and Weight-3, and an operand pair of Pixel-4 and Weight-4) combined from the feature map operands and the weight operands respectively to sub-multipliers. Independent and parallel multiplication operations may be performed on the operand pairs.

Figure 9B:
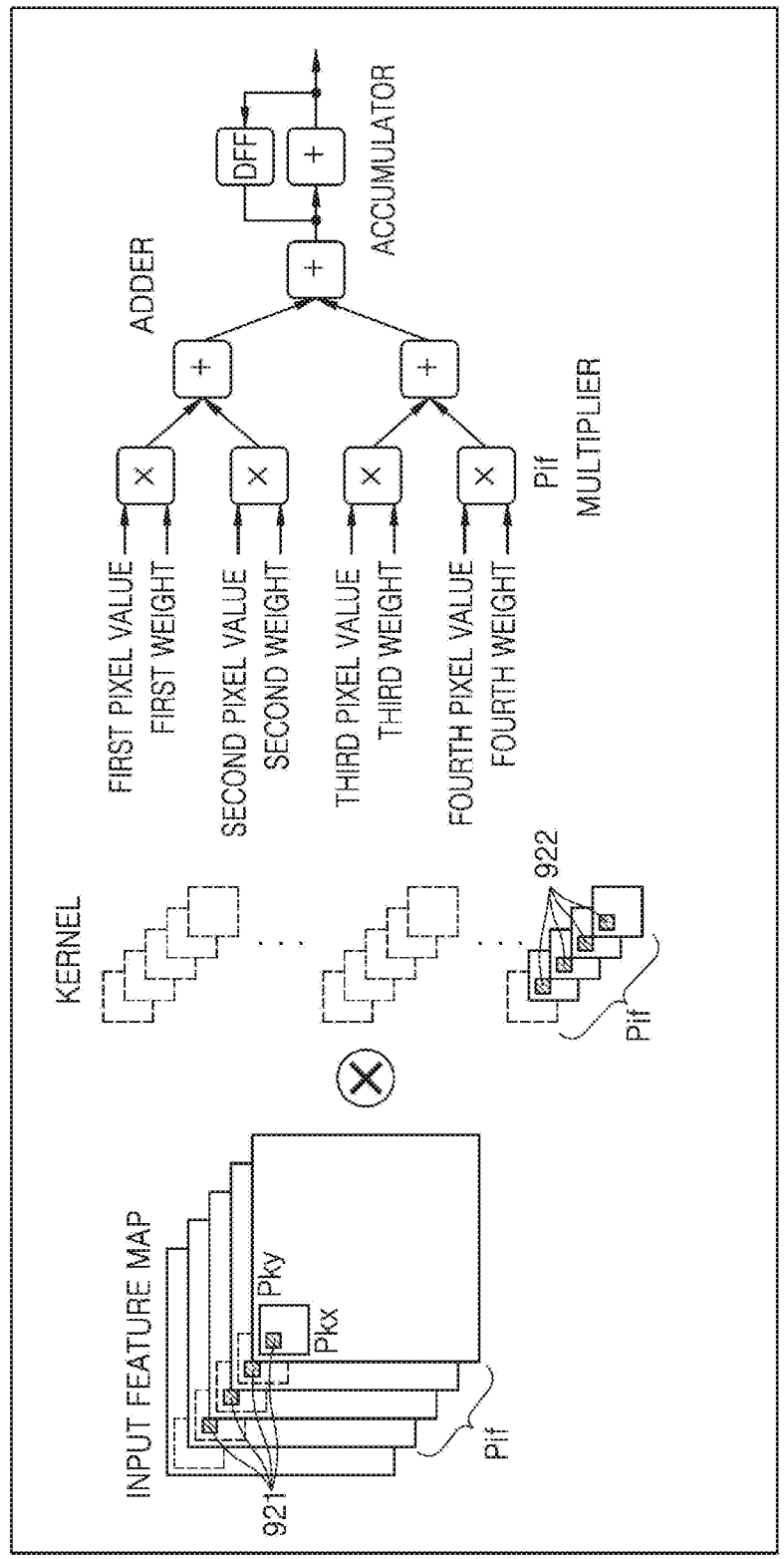

Referring to FIG. 9B, feature map operands that are determined to be capable of being processed in parallel by the processing unit 112 of the processor 110 may be based on pixel values 921, i.e., Pixel-1, Pixel-2, Pixel-3 and Pixel-4, at pixel locations in different input feature maps having references of different input channels of the input feature maps. Also, weight operands that are determined to be capable of being processed in parallel may be based on weights 922, i.e., Weight-1, Weight-2, Weight-3 and Weight-4, at locations in different kernels, which have references of different input channels and any one output channel.

In an example, the dispatcher included in the processing unit 112 dispatches four operand pairs (the operand pair of Pixel-1 and Weight-1, the operand pair of Pixel-2 and Weight-2, the operand pair of Pixel-3 and Weight-3, and the operand pair of Pixel-4 and Weight-4) combined from the feature map operands and the weight operands respectively to sub-multipliers, and the sub-multipliers performs independent and parallel multiplication operations on the operand pairs.

Referring to FIG. 9C, feature map operands that are determined to be capable of being processed in parallel by the processing unit 112 of the processor 110 may be based on pixel values 931, i.e., Pixel-1, Pixel-2, Pixel-3 and Pixel-4, at different pixel locations in any one input feature maps. In an example, the different pixel locations may be pixel locations corresponding to a sliding window, which do not overlap on the input feature map, but are not limited thereto. Also, weight operands that are determined to be capable of being processed in parallel may be based on any one weight 932, i.e., Weight-1, in one kernel that has a reference of an input channel and any one output channel of the input feature map.

The dispatcher included in the processing unit 112 dispatches four operand pairs (an operand pair of Pixel-1 and Weight-1, an operand pair of Pixel-2 and Weight-1, an operand pair of Pixel-3 and Weight-1, and an operand pair of Pixel-4 and Weight-1) combined from the feature map operands and the weight operands respectively to sub-multipliers, and the sub-multipliers performs independent and parallel multiplication operations on the operand pairs.

Figure 9D:
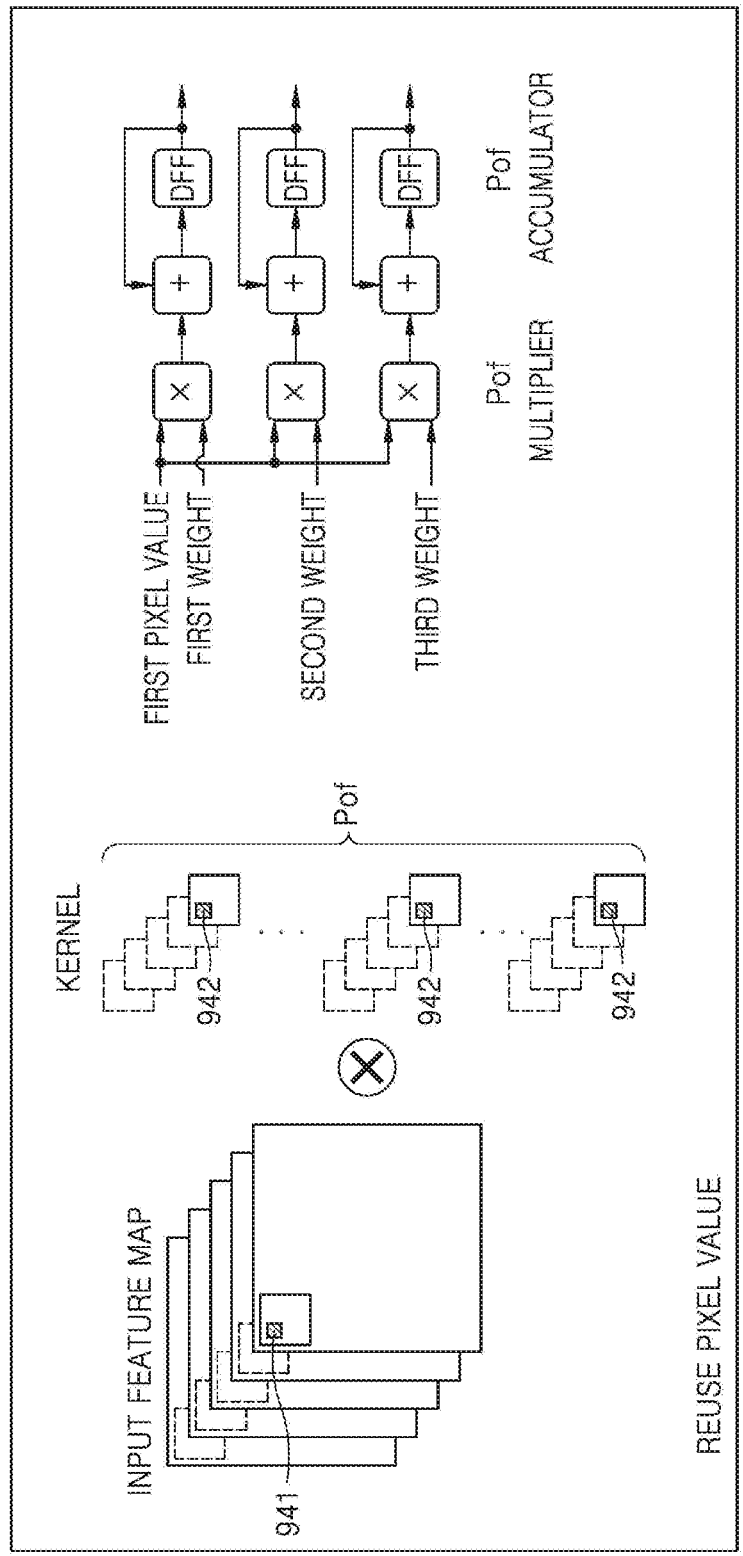

Referring to FIG. 9D, feature map operands that are determined to be capable of being processed in parallel by the processing unit 112 of the processor 110 may be based on a pixel value 941, i.e., Pixel-1, at any pixel location in one input feature map. Also, weight operands that are determined to be capable of being processed in parallel may be based on weights 942, i.e., Weight-1, Weight-2 and Weight-3, at locations in different kernels, which have references of an input channel and different output channels of the input feature map.

The dispatcher included in the processing unit 112 dispatches three operand pairs (an operand pair of Pixel-1 and Weight-1, an operand pair of Pixel-1 and Weight-2, and an operand pair of Pixel-1 and Weight-3) combined from the feature map operands and the weight operands respectively to sub-multipliers, and the sub-multiplier performs independent and parallel multiplication operations on the operand pairs.

Feature map operands and weight operands determined to use parallelism of convolution operations in a neural network, which have been described with reference to FIGS. 9A through 9D, are only examples, and other various operands may be determined for parallel convolution operations. In other words, the processor 110 may determine various feature map operands and various weight operands that are within operand combinations capable of being processed in parallel. The processor 110 may determine operand pairs capable of being processed in parallel and dispatch the operand pairs to sub-multipliers as described above with reference to FIG. 8A or 8B, or in a similar manner, so as to efficiently process convolution operations.

Figure 10:
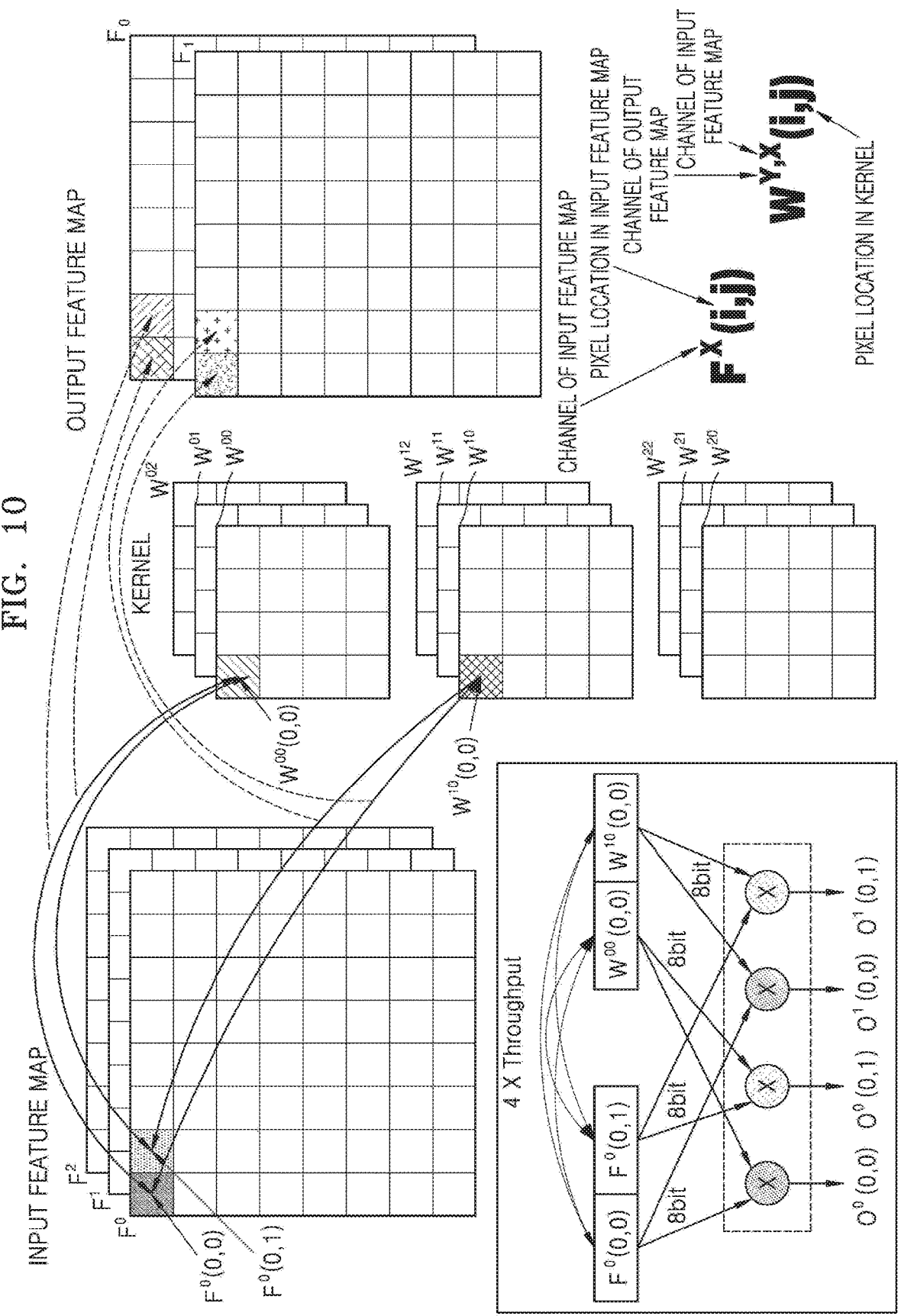
FIG. 10 is a diagram illustrating an example for describing parallelism of operands used in a convolution operation of a neural network.

FIG. 10 is a diagram illustrating an example for describing parallelism of operands used in a convolution operation of a neural network.

Referring to FIG. 10, pixel values of an input feature map and weights of a kernel all correspond to 8-bit operands. However, this is only an example, and the pixel values and the weights may be data of another bit width. Meanwhile, a multiplier included in a convolution operator may be a 16-bit (16×16) multiplier, but is not limited thereto, and may be a multiplier of another precision.

The processor 110 of FIG. 3 determines operands capable of being processed in parallel from among pixel values of input feature maps and weights of kernels.

As shown in FIG. 10, the processor 110 may determine feature map operands based on pixel values at different pixel locations in one of the input feature maps and determine weight operands based on weights at corresponding locations in different kernels having references of an input channel and different output channels of the input feature map, from among the kernels.

For example, when convolution operations are performed between the input feature maps and the kernels, a pixel value $F^0(0,0)$ is used for a multiplication operation with a weight $W^{00}(0,0)$ and a multiplication operation with a weight $W^{10}(0,0)$. Also, a pixel value $F^0(0,1)$ is used for a multiplication operation with the weight $W^{00}(0,0)$ and a multiplication operation with the weight $W^{10}(0,0)$. In this regard, an operand pair of the pixel value $F^0(0,0)$ and the weight $W^{00}(0,0)$, an operand pair of the pixel value $F^0(0,0)$ and the weight $W^{10}(0,0)$, an operand pair of the pixel value $F^0(0,1)$ and the weight $W^{00}(0,0)$, and an operand pair of the pixel value $F^0(0,1)$ and the weight $W^{10}(0,0)$ are all needed for the convolution operations between the input feature maps and the kernels, and are capable of being processed in parallel.

The processor 110 dispatches the four 8-bit operand pairs respectively to four 8-bit sub-multipliers decomposed from a 16-bit multiplier. Accordingly, convolution operations of four channels capable of being processed in parallel may be independently performed. In addition, four outputs for calculation of pixel values of an output feature map may be quickly obtained as results of the convolution operations of four channels, and thus an operation speed may be increased.

Meanwhile, throughout the specification, in $F^X(i,j)$, X is a channel of an input feature map and (i,j) is a pixel location in the input feature map. Also, in $W^{Y,X}(i,j)$, X is a channel of an input feature map, Y is a channel of an output feature map, and (i,j) is a pixel location in a kernel.

Figure 11:
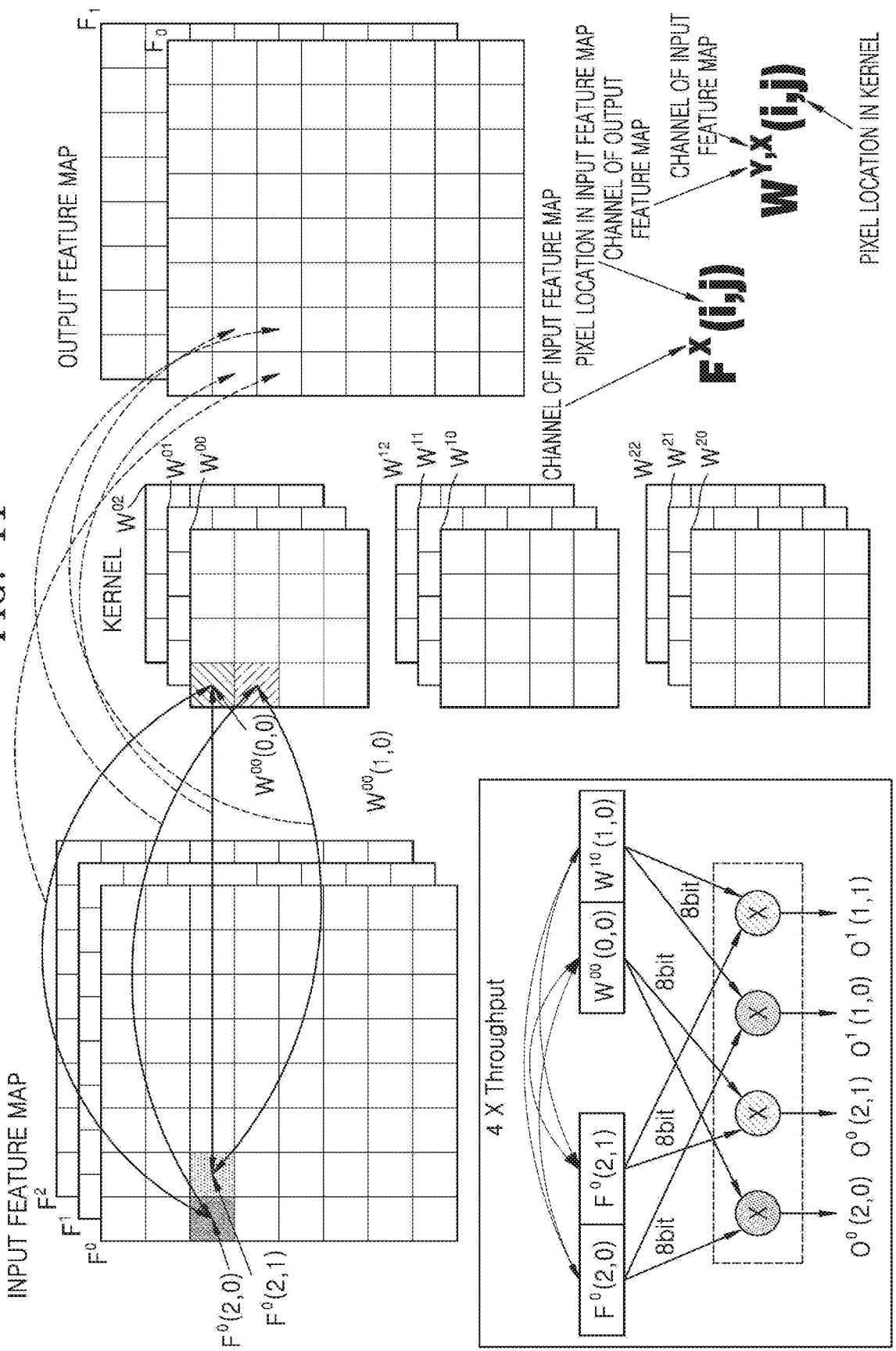
FIG. 11 is a diagram illustrating an example for describing parallelism of operands used in a convolution operation of a neural network.

FIG. 11 is a diagram illustrating an example for describing parallelism of operands used in a convolution operation of a neural network.

Referring to FIG. 11, pixel values of an input feature map and weights of a kernel all correspond to 8-bit operands. However, this is only an example, and the pixel values and the weights may be data of another bit width. Meanwhile, a multiplier included in a convolution operator may be a 16-bit multiplier, but is not limited thereto, and may be a multiplier of another precision.

The processor 110 of FIG. 3 may determine feature map operands based on pixel values at different pixel locations in any one of input feature maps and determine weight operands based on weights at different locations in one of kernels having a reference of an input channel and one of output channels of the input feature map.

For example, when convolution operations are performed between the input feature maps and the kernels, a pixel value $F^0(2,0)$ is used for a multiplication operation with a weight $W^{00}(0,0)$ and a multiplication operation with a weight $W^{00}(1,0)$. Also, a pixel value $F^0(2,1)$ is used for a multiplication operation with the weight $W^{00}(0,0)$ and a multiplication operation with the weight $W^{00}(1,0)$. In this regard, an operand pair of the pixel value $F^0(2,0)$ and the weight $W^{00}(0,0)$, an operand pair of the pixel value $F^0(2,0)$ and the weight $W^{00}(1,0)$, an operand pair of the pixel value $F^0(2,1)$ and the weight $W^{00}(0,0)$, and an operand pair of the pixel value $F^0(2,1)$ and the weight $W^{00}(1,0)$ are all needed for the convolution operations between the input feature maps and the kernels, and are capable of being processed in parallel.

The processor 110 dispatches such four 8-bit operand pairs respectively to four 8-bit sub-multipliers decomposed from a 16-bit multiplier, and independently performs convolution operations of four channels capable of being processed in parallel. Accordingly, four outputs for calculation of pixel values of an output feature map is quickly obtained as results of the convolution operations of four channels, and thus an operation speed is increased.

Operands determined to use parallelism as described with reference to FIGS. 10 and 11 are only examples, and other various operands may be determined for parallel convolution operations. In other words, the processor 110 may determine various feature map operands and various weight operands that are capable of being processed in parallel from input feature maps and kernels. Precisions (or bit widths) of operands determined as such may correspond to precisions (or bit widths) of sub-multipliers logically or physically decomposed according to a precision (or a bit width) of a multiplier, and accordingly, utilization of a multiplication operation of the multiplier may increase.

Figure 12:
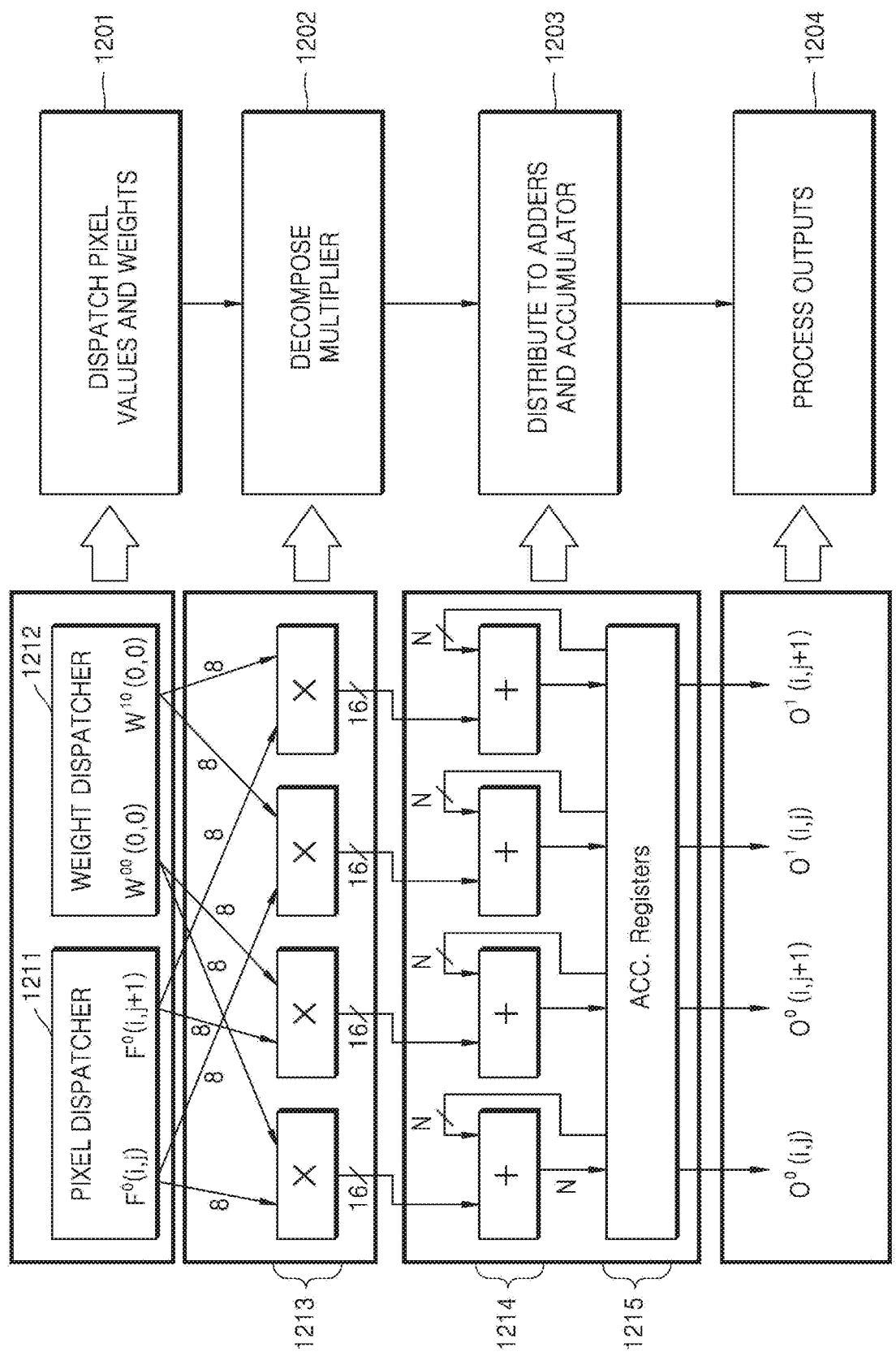
FIG. 12 is a diagram illustrating an example for describing a convolution operator performing a convolution operation of operands.

FIG. 12 is a diagram illustrating an example for describing a convolution operator performing a convolution operation of operands.

In operation 1201, a pixel dispatcher 1211 and a weight dispatcher 1212 included in the processor 110 of FIG. 3 determine m-bit feature map operands and n-bit weight operands from input feature maps and kernels, on which a convolution operation is to be performed, respectively. The pixel dispatcher 1211 and the weight dispatcher 1212 of the processor 110 dispatch, respectively to sub-multipliers in a convolution operator, m×n operand pairs of a feature map operand and a weight operand combined from the feature map operands and the weight operands. For example, the m-bit feature map operands may be operands having a $F^0(i,j)$ reference and a $F^0(i,j+1)$ reference, and the n-bit weight operands may be operands having a $W^{00}(0,0)$ reference and a $W^{10}(0,0)$ reference, but are not limited thereto. Here, the m-bit and the n-bit may both be an 8-bit, but are not limited thereto.

In operation 1202, when the convolution operator included in the processor 110 includes a k-bit multiplier having full precision of k bits, the k-bit multiplier is logically or physically decomposed to sub-multipliers 1213 corresponding to sub-logics. Here, when the k-bit multiplier corresponds to a 16-bit multiplier, the sub-multipliers 1213 may correspond to 8-bit (=k/2) multipliers.

The pixel dispatcher 1211 may dispatch a feature map operand having the $F^0(i,j)$ reference to the first and the third sub-multipliers 1213 in FIG. 12, and a feature map operand having the $F^0(i,j+1)$ reference to the second and the fourth sub-multipliers 1213 in FIG. 12. The weight dispatcher 1212 may dispatch a weight operand having the $W^{00}(0,0)$ reference to the first and the second sub-multipliers 1213 in FIG. 12, and a weight operand having the reference $W^{10}(0,0)$ to the third and the fourth sub-multiplier 1213 in FIG. 12.

In operation 1203, results of multiplication operations performed by the sub-multipliers 1213 are respectively output to 16×N-bit adders 1214 for addition operations, wherein N is a natural number. The convolution operator further includes the adders 1214. When the addition operations are completed, results of the addition operations are output to an accumulation operator 1215 for an accumulation operation.

In operation 1204, the accumulation operator 1215 provides four outputs $O^0(i,j)$, $O^0(i,j+1)$, $O^1(i,j)$, and $O^1(i,j+1)$ corresponding to results of convolution operations of four channels.

Figure 13:
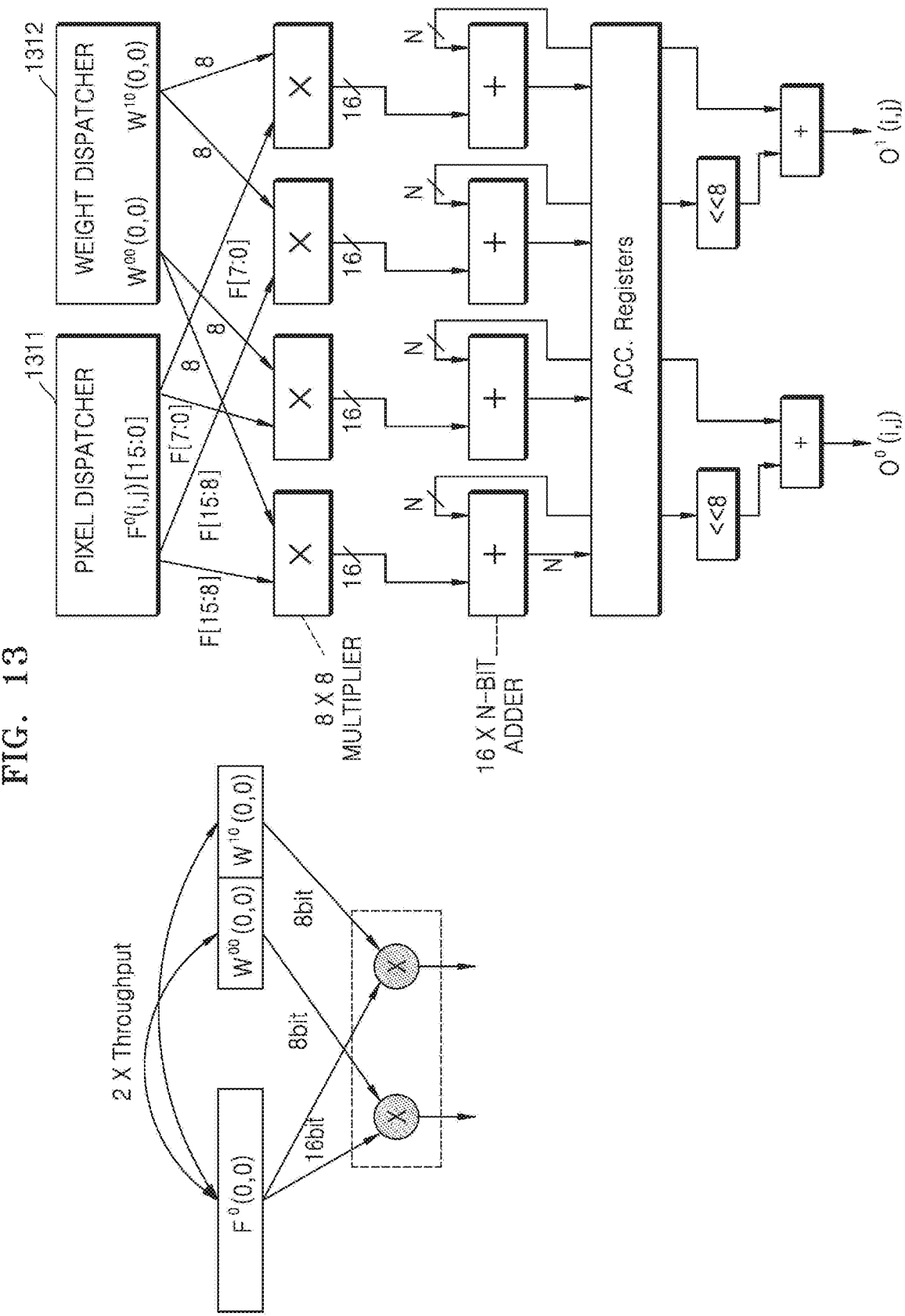
FIG. 13 is a diagram illustrating an example for describing a convolution operator performing a convolution operation of operands.

FIG. 13 is a diagram illustrating an example for describing a convolution operator performing a convolution operation of operands.

Referring to FIG. 13, a feature map operand having a $F^0(i,j)$ reference is a 16-bit operand, weight operands having a $W^{00}(0,0)$ reference and a $W^{10}(0,0)$ reference are each an 8-bit operand. The feature map operand and the weight operands are dispatched to 8-bit sub-multipliers decomposed from a 16-bit multiplier.

A pixel dispatcher 1311 dispatches a most significant bit (MSB) of 8 bits in the 16-bit feature map operand having the $F^0(i,j)$ reference to the first and the third sub-multipliers in FIG. 13. The pixel dispatcher 1311 dispatches a least significant bit (LSB) of 8 bits in the 16-bit feature map operand having the $F^0(i,j)$ reference to the sub-multipliers at the second and the fourth in FIG. 13. A weight dispatcher 1312 dispatches the weight operand having the $W^{00}(0,0)$ reference to the first and the second sub-multipliers in FIG. 13. The weight dispatcher 1312 dispatches the weight operand having the $W^{10}(0,0)$ reference to the third and the fourth sub-multipliers in FIG. 13.

As results of operations performed by the multiplier (8-bit sub-multipliers), 16×N-bit adders, and an accumulator of the convolution operator, two outputs $O^0(i,j)$ and $O^1(i,j)$ are provided.

Figure 14:
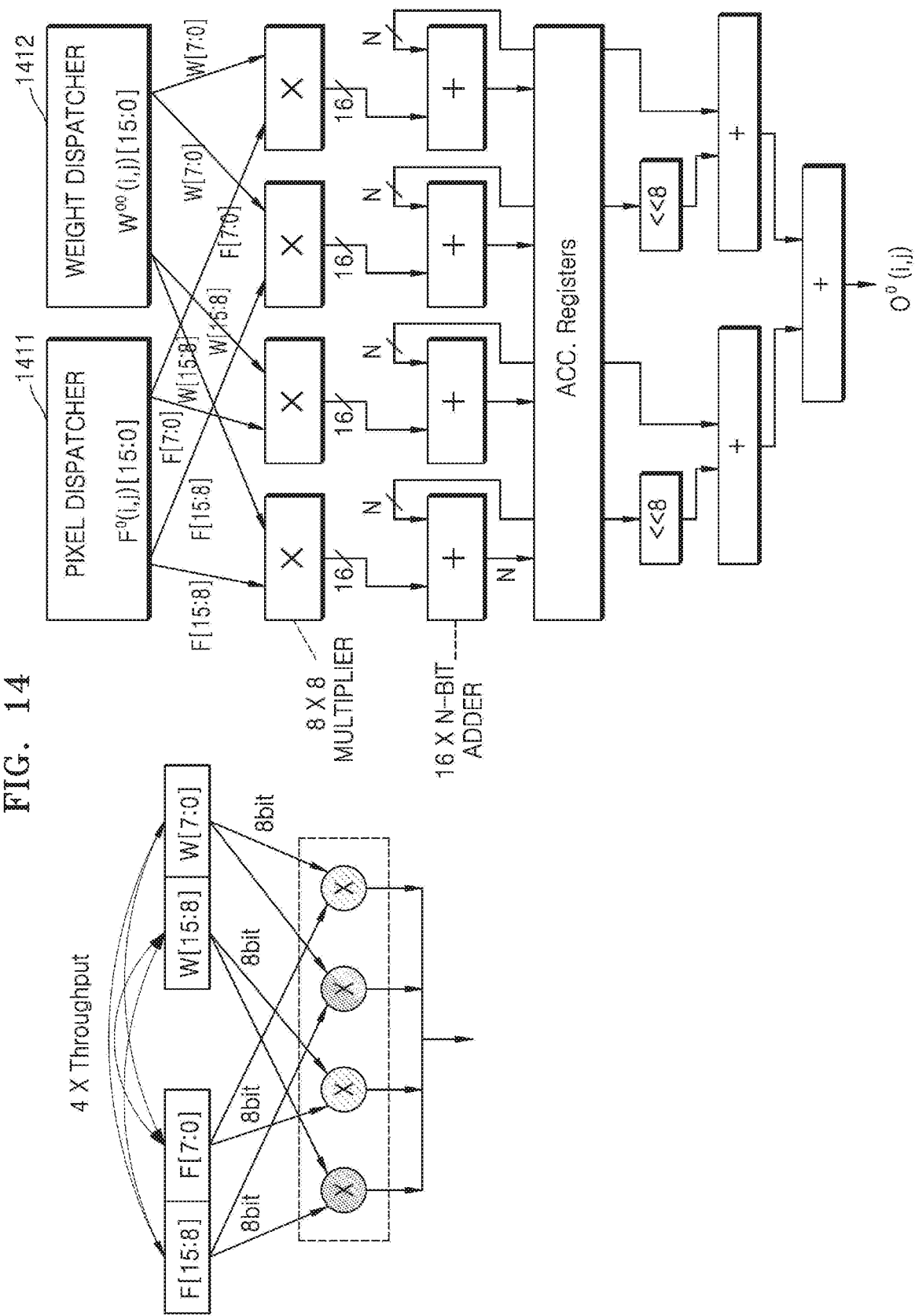
FIG. 14 is a diagram illustrating an example for describing a convolution operator performing a convolution operation of operands.

FIG. 14 is a diagram illustrating an example for describing a convolution operator performing a convolution operation of operands.

Referring to FIG. 14, unlike FIG. 13, a feature map operand having a $F^0(i,j)$ reference and a weight operand having a $W^{00}(0,0)$ reference are 16-bit operands, and are dispatched to 8-bit sub-multipliers decomposed from a 16-bit multiplier.

A pixel dispatcher 1411 dispatches the MSB of 8 bits in the 16-bit feature map operand having the $F^0(i,j)$ reference to the first and the third sub-multipliers in FIG. 14, and the LSB of 8 bits in the 16-bit feature map operand to the second and the fourth sub-multipliers in FIG. 14. Also, a weight dispatcher 1412 dispatches the MSB of 8 bits in the 16-bit weight operand having the $W^{00}(0,0)$ reference to the first and the second sub-multiplier in FIG. 14, and the LSB of 8 bits in the 16-bit weight operand to the third and the fourth sub-multiplier in FIG. 14.

As a result of operations performed by the multiplier (8-bit sub-multipliers), 16×N-bit adders, and an accumulator of the convolution operator, one output $O^0(i,j)$ is finally provided.

As described above, by using parallelism of operand pairs of convolution operations, utilization of a multiplier may be increased even when the multiplier supports various precisions (or bit widths).

Figure 15:
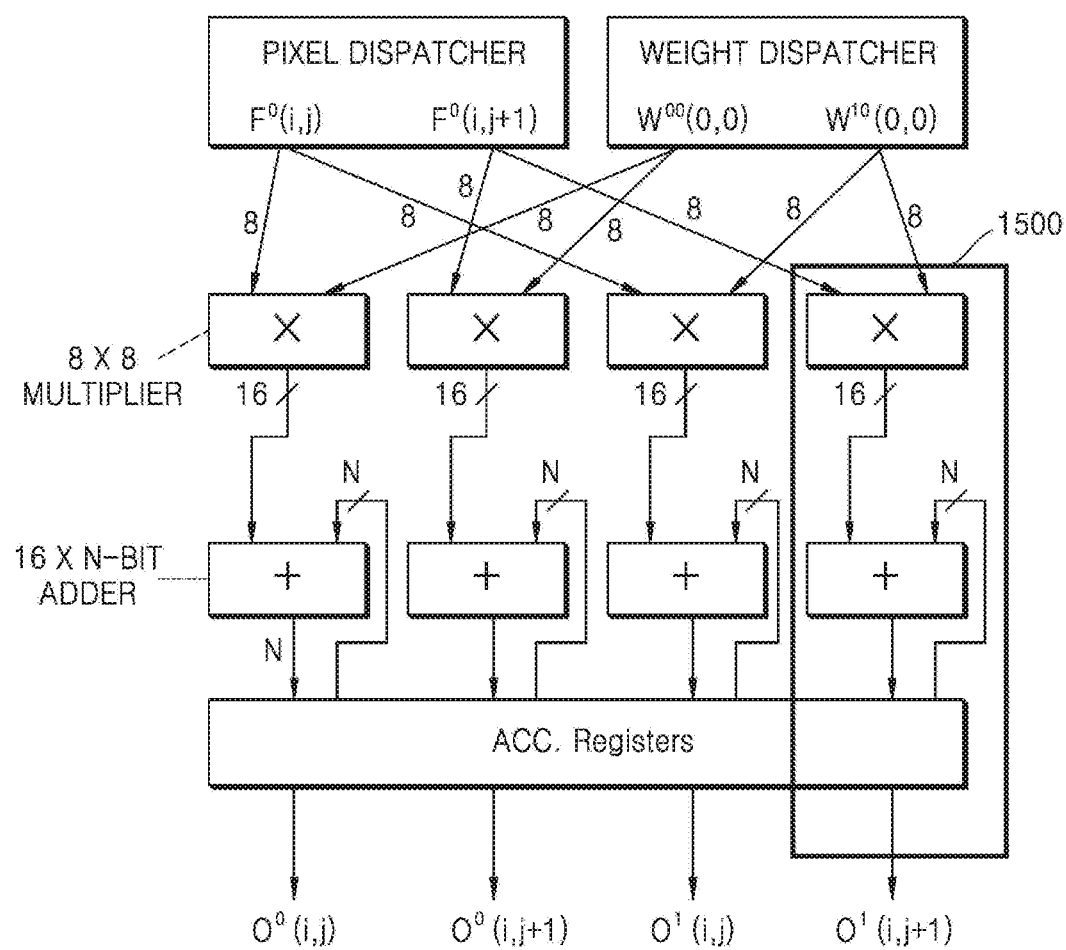
FIG. 15 is a diagram illustrating an example for describing a convolution operation to be performed when some operands are zero.

FIG. 15 is a diagram illustrating an example for describing a convolution operation to be performed when some operands are zero.

Referring to FIG. 15, as indicated by reference numeral 1500, an operand dispatched to a sub-multiplier may be zero. In this case, a result of multiplication and addition operations is zero. Accordingly, it may be a waste of hardware resources to perform multiplication and addition operations. Accordingly, dispatchers (a pixel dispatcher and a weight dispatcher) may determine whether there is a zero operand from among operands to be dispatched, and control operations of a sub-multiplier, an adder, and an accumulator, to which the zero operand is to be dispatched, to be clock-gated.

FIG. 16 is a diagram illustrating an example for describing determining of a zero operand.

Referring to FIG. 16, the processor 110 of FIG. 3 may determine whether a zero operand exists from among feature map operands and weight operands. At this time, the processor 110 may determine whether all bits of a pixel value (a feature map operand) of m bits or a weight (a weight operand) of n bits correspond to zero. In another example, when the pixel value of m bits or the weight of n bits are split into certain bit widths and dispatched as individual independent feature map operands or weight operands, the processor 110 may determine whether some of bits (sub-bits) 1601 correspond to zero.

TABLE 1

| Probability of each piece of 4-bit sub-data being zero in layer output data of VGG16 | | | |
|---|---|---|---|
| Data[15:12] | Data[11:8] | Data[7:4] | Data[3:0] |
| 99% | 84% | 56% | 50% |

Probability of all values of 16-bit data being zero: 47.1%

Experimentally, in an example of a VGG-16-based neural network, when 16-bit output data of a layer is split into sub-bits of 4 bits, a probability of the MSB of 4 bits being zero is 99% and a probability of 4 bits after the MSB being zero is 84%, as shown in Table 1. Accordingly, when the processor 110 splits and dispatches, to sub-multipliers, the pixel value of m bits or the weight of n bits into certain bit widths, it is highly likely that the number of zero operands is present, and thus a processing speed of the processor 110 may be increased via several clock-gatings.

Figure 17:
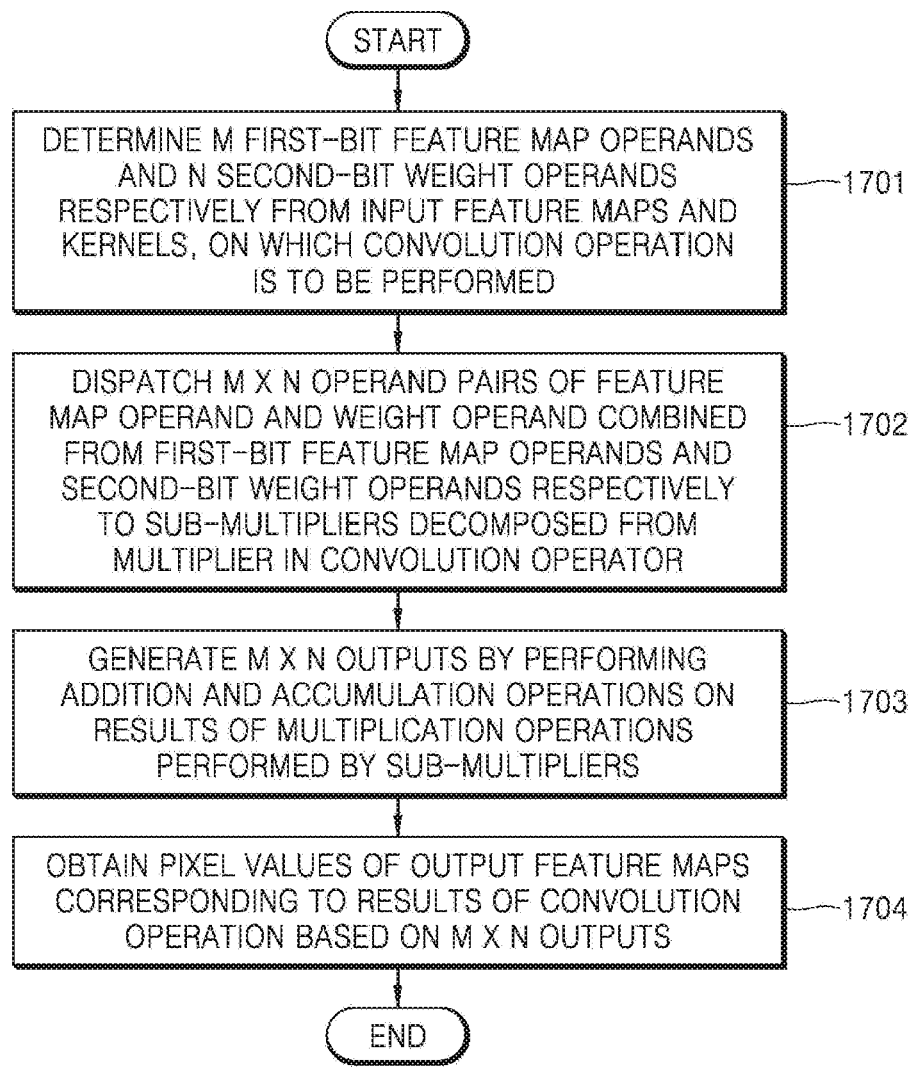
FIG. 17 is a diagram illustrating an example of a method of processing a convolution operation in a neural network.

FIG. 17 is a diagram illustrating an example of a method of processing a convolution operation in a neural network. The operations in FIG. 17 may be performed in the sequence and manner as shown, although the order of some operations may be changed or some of the operations omitted without departing from the spirit and scope of the illustrative examples described. Many of the operations shown in FIG. 17 may be performed in parallel or concurrently. One or more blocks of FIG. 17, and combinations of the blocks, can be implemented by special purpose hardware-based computer that perform the specified functions, or combinations of special purpose hardware and computer instructions. In addition to the description of FIG. 17 below, the descriptions of FIGS. 1-16 are also applicable to FIG. 17, and are incorporated herein by reference. Thus, the above description may not be repeated here.

In operation 1701, the processor 110 of FIG. 3 determines m first-bit feature map operands and n second-bit weight operands respectively from input feature maps and kernels, on which a convolution operation is to be performed, wherein m and n are each a natural number.

In operation 1702, the processor 110 dispatches m×n operand pairs of a feature map operand and a weight operand combined from the first-bit feature map operands and the second-bit weight operands respectively to sub-multipliers decomposed from a multiplier in a convolution operator.

In operation 1703, the processor 110 generates m×n outputs by performing addition and accumulation operations on results of multiplication operations performed by the sub-multipliers.

In operation 1704, the processor 110 obtains pixel values of output feature maps corresponding to a result of the convolution operation based on the m×n outputs.

Figure 18:
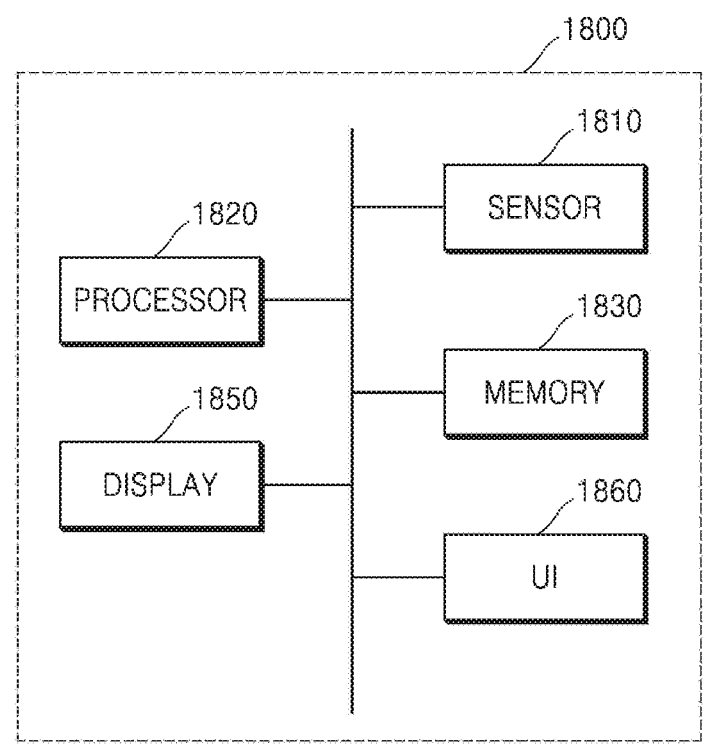
FIG. 18 is a diagram illustrating an example of an electronic system or device configured to implement a neural network.

FIG. 18 is a diagram illustrating an example of an electronic system or device 1800 configured to implement a neural network.

Referring to FIG. 18, the electronic system or device 1800 includes a sensor 1810, a processor 1820, a local memory 1825 (not shown), a memory 1830, a display 1850, and a user interface (UI) 1860. The sensor 1810, the processor 1820, the memory 1830, the display 1850, and the UI 1860 communicate with each other via a bus 1840. The electronic system or device 1800 may correspond to the neural network apparatus 10 of FIG. 3, and may implement any one or more or all of the above processes or methods. As a non-limiting example, the processor 1820 may correspond to processor 110 of FIG. 3, and/or the memory 1830 may correspond to the memory 120 of FIG. 3. The local memory 1825 may correspond to any of the above described temporary or local buffers/memories, while the memory 1830 may store a database from which kernel elements, feature maps, weight elements, voice elements, and/or image elements may be loaded from and into the local memory 1825. In an example, the local buffers/memories may be memories of the processor 1820 or buffers/memories directly connected to the processor 1820, e.g., configured for rapidly transferring data to/from the processor 1820 and the local memory 1825, noting that alternatives are also available. The local memory 1825 may further be allocated to temporarily store convolutional output results of a particular layer of the neural network, or all layers of the neural network, the ultimate output results of which may be stored in the memory 1830 and/or respectively used for inputs to a next layer. In an example, except for purposes of an input to a next layer, the convolutional results of each layer may discarded and only final layer(s) output results of the neural network stored to the memory 1830 or used for another process, such as in cooperation with an unlocking and corresponding display operation of a mobile phone as the electronic system or device 1800. As also noted, the processor 1820 may represent one or more processors that are configured as any one or any combination of the above neural network processing apparatuses or recognition apparatuses, as non-limiting examples.

The sensor 1810 includes, for example, a microphone and/or an image sensor or camera to sense video data and audio data to recognize, reject, or verify an object, for example. In an example, the sensor 1810 senses an image using a well-known scheme, for example, a scheme of converting an optical image to an electronic signal. An output of the sensor 1810 is transferred to the processor 1820 or the memory 1830, and output of the sensor 1810 may also be transferred directly to, or operate as, an input layer of a neural network discussed herein.

The processor 1820 may be configured to perform one or more or all processes described with reference to FIGS. 1-17. For example, to perform a recognition, rejection, or verification operation, the processor 1820 may recognize, reject, or verify the input data based on the neural network processing operations described above with respect to FIGS. 1-17, which may also be considered acceleration processes that efficiently processes a convolution operation in a neural network by suitably using a dispatching pattern according to precisions (or bit widths) of individual operands and parallelism of individual convolution operations to be processed in the neural network that may be different from the neural network from which the kernels were trained, for example. In another example, when there is a zero operand from among operands, the operations of a sub-multiplier, an adder, or an accumulator, to which the zero operand is to be dispatched, is clock-gated. The result of any of the recognition, rejection, or verification operations may be output through the display 1850. In addition, user adjustments or selective operations of the neural network processing operations discussed herein may be provided by UI 1860, which may include a touch screen or other input/output device/system. As noted above and described below, the processor 1820 may be a graphics processor unit (GPU), reconfigurable processor, or have any other type of multi- or single-processor configuration.

In addition to operations of one or more of the neural network processing apparatuses and/or operations described in FIGS. 1-17 as noted above, the memory 1830 may further store instructions which, when executed by processor 1820, cause the processor 1820 to perform additional operations, functions, and controls of the electronic system or device 1800, such as a user interface of the electronic system. The electronic system or device 1800 may be connected to an external device, for example, a personal computer (PC) or a network, via an input/output device of the electronic system, to exchange data with the external device. The electronic system or device 1800 may be various electronic devices, as only non-limiting examples, a mobile device, for example, a mobile telephone, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, various Internet of Things (IoT) devices, or any other device capable of wireless communication or network communication consistent with that disclosed herein.

The neural network apparatus 10, processing unit 112, 16-bit multiplier 403, 16-bit multiplier 413, 16-bit multiplier 521, 16-bit multiplier 561, sub-multiplier 562, sub-multiplier 563, 16-bit storage area 701, 16-bit storage area 711, sub-multipliers 811-814, sub-multipliers 821-824, pixel dispatcher 1211, weight dispatcher 1212, sub-multipliers 1213, N-bit adders 1214, accumulation operator 1215, pixel dispatcher 1311, weight dispatcher 1312, pixel dispatcher 1411, weight dispatcher 1412, adder, accumulator, multiplier, sub-multipliers, N-bit adders, 8-bit sub-multipliers, 16-bit multiplier, pixel dispatcher, weight dispatcher, and other apparatus, units, modules, devices, and other components described are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-18 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of processing convolution operations in a neural network. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as a multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing a convolution operation in a neural network, the method comprising:
   determining a total of m first-bit feature map operands and a total of n second-bit weight operands from input feature maps and kernels, respectively, on which the convolution operation is to be performed in parallel, wherein m and n are each a natural number, and where each first-bit feature map operand is a pixel value or portion of the pixel value and each second-bit weight operand is a kernel weight value or a portion of the kernel weight value;
   dispatching each of m×n operand pairs, each of a feature map operand and a weight operand that are respectively combined from the m first-bit feature map operands and the n second-bit weight operands, respectively, to different decomposed sub-multipliers in a convolution operator;
   generating m×n outputs by performing addition and accumulation operations on results of multiplication operations performed by the decomposed sub-multipliers; and
   obtaining pixel values of output feature maps corresponding to results of the convolution operation based on the m×n outputs,
   wherein the sub-multipliers are decomposed sub-logic multipliers in a k-bit multiplier included in the convolution operator, having a full precision of k bits,
   wherein each of the first-bit feature map operands has a total bit width equal to the first-bit, each of the second-bit weight operands has a total bit width equal to the second-bit, both of the first-bit and the second-bit are equal or less than k-bit, where k-bit is a maximum single input bit width of the k-bit multiplier.

2. The method of claim 1, wherein the first-bit feature map operands are pixel values at different pixel locations in an input feature map.

3. The method of claim 2, wherein the second-bit weight operands are weight values at corresponding locations in different kernels from among plural kernels,
   wherein the different kernels reference an input channel and different output channels of the input feature map.

4. The method of claim 2, wherein the second-bit weight operands are weight values at different locations in a kernel,
   wherein the kernel references an input channel and any one output channel of the input feature map.

5. The method of claim 1, wherein the first-bit feature map operands are pixel values at corresponding pixel locations in different input feature maps from among plural input feature maps,
   wherein the different input feature maps correspond to different input channels.

6. The method of claim 5, wherein the second-bit weight operands are weight values at corresponding locations in different kernels from among the kernels,
   wherein the different kernels correspond to the different input channels and any one output channel.

7. The method of claim 5, wherein the second-bit weight operands are weight values at corresponding locations in different kernels from among plural kernels,
   wherein the different kernels correspond to the different input channels and different output channels.

8. The method of claim 1, wherein:
   the first-bit and the second-bit are each smaller than the k-bit, and
   each of the decomposed sub-multipliers corresponds to a multiplier of the first-bit or a multiplier of the second-bit, where the first-bit is a maximum single input bit width of the first-bit multiplier and the second-bit is a maximum single input bit width of the second-bit multiplier.

9. The method of claim 8, wherein:
   the first-bit and the second-bit are both equal to k/2-bit,
   each of the decomposed sub-multipliers corresponds to a k/2-bit multiplier, where the k/2 bit is a maximum single input bit width of each decomposed sub-multiplier, and
   operand pairs, in which the first-bit feature map operands and the second-bit weight operands are mapped to each other, are respectively dispatched to different decomposed sub-multipliers.

10. The method of claim 8, wherein:
    operand pairs, in which the first-bit feature map operands and most significant bits of k/2 bits in the second-bit weight operands are mapped to each other, and operand pairs, in which the first-bit feature map operands and least significant bits of k/2 bits in the second-bit weight operands are mapped to each other, are respectively dispatched to a first decomposed sub-multiplier and a second decomposed sub-multiplier, in response to the first-bit and the second-bit both being equal to k-bit, and
    operand pairs, in which most significant bits of k/2 bits in the first-bit feature map operands and the second-bit weight operands are mapped to each other, and operand pairs, in which least significant bits of k/2 bits in the first-bit feature map operands and the second-bit weight operands are mapped to each other, are respectively dispatched to a third decomposed sub-multiplier and a fourth decomposed sub-multiplier, in response to the first-bit and the second-bit both being equal to k/2-bit.

11. The method of claim 8, wherein:
operand pairs, in which most significant bits and least significant bits of k/2 bits in the first-bit feature map operands and most significant bits and least significant bits of k/2 bits in the second-bit weight operands are mapped to each other, is respectively dispatched to the decomposed sub-multipliers, in response to the first-bit and the second-bit both being equal to k-bit.

12. The method of claim 1, further comprising clock-gating a multiplication operation of a sub-multiplier to which a zero operand is dispatched, for zero skipping, in response to the zero operand being present in the m×n operand pairs.

13. A non-transitory computer-readable storage medium storing instructions that, when executed by a processor, cause the processor to perform the method of claim 1.

14. The method of claim 1, wherein the generating of the m x n outputs by performing the addition and accumulation operations includes using an adder and an accumulator included in the convolution operator.

15. The method of claim 1, wherein a product of the first-bit and the second-bit is equal to a product of k and a total number of the sub-multipliers.

16. The method of claim 1, wherein the sub-multipliers is a sub-multiplier that is decomposed from the k-bit multiplier to have a selected bit precision that is less than a full bit precision of the k-bit multiplier.

17. The method of claim 16, wherein the selected bit precision is determined based on a bit precision of at least one operand of an operand pair, of the operand pairs.

18. The method of claim 1, wherein the dispatching of the m x n operand pairs comprising:
dispatching a first operand pair including a first feature map operand and a first weight operand to a first sub-multiplier of the sub-multipliers; and
dispatching a second operand pair including the first feature map operand and a second weight operand to a second sub-multiplier of the sub-multipliers.

19. The method of claim 1, wherein the dispatching of the m x n operand pairs comprising:
dispatching a first operand pair including a first feature map operand and a first weight operand to a first sub-multiplier of the sub-multipliers; and
dispatching a second operand pair including a second feature map operand and the first weight operand to a second sub-multiplier of the sub-multipliers.

20. An apparatus for processing a convolution operation in a neural network, the apparatus comprising:
a processor configured to:
determine a total of m first-bit feature map operands and a total of n second-bit weight operands from input feature maps and kernels, respectively, on which the convolution operation is to be performed in parallel, wherein m and n are each a natural number, and where each first-bit feature map operand is a pixel value or portion of the pixel value and each second-bit weight operand is a kernel weight value or a portion of the kernel weight value;
dispatch each of m×n operand pairs, each of a feature map operand and a weight operand that are respectively combined from the m first-bit feature map operands and the n second-bit weight operands, respectively to different decomposed sub-multipliers in a convolution operator;
generate m×n outputs by performing addition and accumulation operations on results of multiplication operations performed by the decomposed sub-multipliers; and
obtain pixel values of output feature maps corresponding to results of the convolution operation based on the m×n outputs,
wherein the sub-multipliers are sub-logic multipliers in a k-bit multiplier included in the convolution operator, having a full precision of k bits,
wherein each of the first-bit feature map operands has a total bit width equal to the first-bit, each of the second-bit feature map operands has a total bit width equal to the second-bit, both the first-bit and the second-bit are equal to or less than k-bit, where k-bit is a maximum single input bit width of the k-bit multiplier.

21. The apparatus of claim 20, wherein the first-bit feature map operands are pixel values at different pixel locations in an input feature map.

22. The apparatus of claim 21, wherein the second-bit weight operands are weight values at corresponding locations in different kernels from among plural kernels, wherein the different kernels reference an input channel and different output channels of the input feature map, or
the second-bit weight operands are weight values at different locations in one kernel from among the plural kernels, wherein the kernel references an input channel and any one output channel of the one input feature map.

23. The apparatus of claim 20, wherein the first-bit feature map operands are pixel values at corresponding pixel locations in different input feature maps, wherein the different input feature maps correspond to different input channels.

24. The apparatus of claim 23, wherein the second-bit weight operands are weight values at corresponding locations in different kernels from among plural kernels, wherein the different kernels correspond to the different input channels and any one output channel, or
the second-bit weight operands are weight values at corresponding locations in different kernels from among the plural kernels, wherein the different kernels correspond to the different input channels and different output channels.

25. The apparatus of claim 20, wherein:
the first-bit and the second-bit are each smaller than the k-bit, and
each of the decomposed sub-multipliers corresponds to a multiplier of the first-bit or a multiplier of the second-bit, where the first-bit is a maximum single input bit width of the first-bit multiplier and the second-bit is a maximum single input bit width of the second-bit multiplier.

26. The apparatus of claim 25, wherein:
the first-bit and the second-bit both equal to k/2-bit,
each of the decomposed sub-multipliers corresponds to a k/2-bit multiplier, where the k/2 bit is a maximum single input bit width of each decomposed sub-multiplier, and
the operand pairs, in which the first-bit feature map operands and the second-bit weight operands are mapped to each other, are respectively dispatched to the decomposed sub-multipliers.

27. The apparatus of claim 25, wherein:
operand pairs, in which the first-bit feature map operands and most significant bits of k/2 bits in the second-bit weight operands are mapped to each other, and operand pairs, in which the first-bit feature map operands and least significant bits of k/2 bits in the second-bit weight operands are mapped to each other, are respectively dispatched to a first decomposed sub-multiplier and a second decomposed sub-multiplier, in response to the first-bit and the second-bit both being equal to k-bit, and operand pairs, in which most significant bits of k/2 bits in the first-bit feature map operands and the second-bit weight operands are mapped to each other, and operand pairs, in which least significant bits of k/2 bits in the first-bit feature map operands and the second-bit weight operands are mapped to each other, are respectively dispatched to a third decomposed sub-multiplier and a fourth decomposed sub-multiplier, in response to the first-bit and the second-bit both being equal to k/2-bit.

28. The apparatus of claim 25, wherein:

operand pairs, in which most significant bits and least significant bits of k/2 bits in the first-bit feature map operands and most significant bits and least significant bits of k/2 bits in the second-bit weight operands are mapped to each other, is respectively dispatched to the decomposed sub-multipliers, in response to the first-bit and the second-bit both being equal to k-bit.

29. The apparatus of claim 20, wherein the processor is further configured to, clock-gate a multiplication operation of a sub-multiplier to which a zero operand is dispatched, for zero skipping, in response to a zero operand being present in the m x n operand pairs.

\* \* \* \* \*